United States Patent
Corigliano et al.

(10) Patent No.: US 7,269,494 B2
(45) Date of Patent: Sep. 11, 2007

(54) METHOD AND SYSTEM FOR RECOGNIZING THE SIGN OF THE VELOCITY OF A VEHICLE AND FOR ESTIMATING THE ROAD SLOPE

(75) Inventors: Emanuel Corigliano, Orbassano (IT); Pandeli Borodani, Orbassano (IT)

(73) Assignee: C.R.F. Societa Consortile per Azioni, Obassano (Turin) (IT)

( * ) Notice: Subject to any disclaimer, the term of this patent is extended or adjusted under 35 U.S.C. 154(b) by 0 days.

(21) Appl. No.: 11/531,517

(22) Filed: Sep. 13, 2006

(65) Prior Publication Data
US 2007/0083314 A1 Apr. 12, 2007

(30) Foreign Application Priority Data
Sep. 14, 2005 (EP) .................................. 05425641

(51) Int. Cl.
*G05D 1/00* (2006.01)
(52) U.S. Cl. .............................. 701/80; 701/1; 701/72; 73/511; 340/440

(58) Field of Classification Search .................... 701/1, 701/36, 37, 45, 70, 75, 84, 87, 88, 90, 96, 701/80; 73/488, 489, 510, 511; 340/440
See application file for complete search history.

(56) References Cited

U.S. PATENT DOCUMENTS

| 5,832,400 | A | 11/1998 | Takahashi et al. |
| 6,389,345 | B2 * | 5/2002 | Phelps ........................ 701/50 |
| 6,718,248 | B2 * | 4/2004 | Lu et al. ...................... 701/70 |

FOREIGN PATENT DOCUMENTS

| FR | 2857925 | 1/2005 |
| JP | 2000-27673 | 1/2000 |
| JP | 2000-35117 | 2/2000 |

\* cited by examiner

*Primary Examiner*—Richard M. Camby
(74) *Attorney, Agent, or Firm*—Sughrue Mion Pllc

(57) ABSTRACT

A method of estimating the slope of a road surface on which is positioned a motor vehicle. The slope is determined by measuring the velocity and longitudinal acceleration of the vehicle by means of a mathematical model based on the relation $A_x = \dot{v} + g \sin \alpha$, where $A_x$ is longitudinal acceleration, $\dot{v}$ indicates the component of longitudinal acceleration of the vehicle along the road surface, $g$ is the gravitational acceleration, and $\alpha$ represents the angle of inclination of the road surface.

15 Claims, 22 Drawing Sheets

METHOD AND SYSTEM FOR RECOGNIZING THE SIGN OF THE VELOCITY OF A VEHICLE AND FOR ESTIMATING THE ROAD SLOPE

The present invention relates to a method of estimating the slope of a road on which there is a motor vehicle provided with rotational velocity sensor means for measuring the modulus of the velocity of the vehicle and with acceleration measuring means for measuring the acceleration in the longitudinal direction of the vehicle.

The information about the road slope can be used for various purposes in a vehicle.

In machines fitted with robotized automatic gearboxes, the optimization of the performance and comfort of the gear changes and of the assisted starting is a considerable problem. This is because, if the map of gear changes is calibrated to provide specific driving performance on the flat, the same performance is not guaranteed for different road slopes. However, an estimate of the slope can be used to translate the gear change map in an appropriate way in order to provide better and uniform behaviour for different road profiles.

As in the case of automatic drive-away control, the estimation of the road gradient is used to make the driving feel uniform when the vehicle is started in different slope conditions. In particular, the drive-away control algorithm provides for the generation of references for the angular velocity of the engine and of the primary gearbox shaft, as a function of the level of the accelerator pedal depressed by the user. These angular velocity profiles are supplied to a low-level controller which operates the actuators for the torque supplied by the engine and the torque transmitted by the clutch, in order to obtain an evolution of the actual engine speed and the speed of the primary gearbox shaft which is as close as possible to the reference value. A more uniform driving feel is obtained by using the slope information for the appropriate correction of the reference profiles of the angular velocities of the engine and of the primary gearbox shaft.

Generally, the information on the velocity of vehicles is derived from the measurement of the angular velocities of the wheels, which are measured by sensors which normally recognize the modulus of these velocities. Such a system does not provide a correct slope estimate for negative velocities. This problem is critical, for example, when it is desired to optimize the performance of the drive-away control algorithm. This is because, at the time of driving away, the sign of the vehicle's velocity may not be compatible with the gear which is engaged and therefore a correct estimate of the slope must include reliable information on the direction of movement.

The present invention resolves the aforesaid problems by means of a method for estimating the road slope having the characteristics defined in the claims.

The method according to the invention makes it possible to recognize the direction of movement of the vehicle and to estimate the road slope without the use of special sensors apart from the accelerometer (measuring the longitudinal motion of the vehicle) and sensors of the modulus of the rotational velocity of the transmission shafts (the wheels and the primary gearbox shaft).

This is because the slope estimator according to the invention includes an algorithm for recognizing the sign of the velocity, which can be used in various applications, particularly in the field of transmission control. This algorithm provides an estimate of the direction of movement of the vehicle.

The system for estimating the road slope and the direction of movement was implemented and tested experimentally in the drive-away control system, making the slope estimation highly reliable even when the vehicle is reversing.

The invention also proposes a system for estimating the slope of a road having the characteristics defined in the claims, and a computer program product which can be loaded into the memory of a computer and which comprises portions of software code for implementing the method according to the invention, when the product is run on a computer.

Further characteristics and advantages of the invention will be made clear by the following detailed description, provided purely by way of example and without restrictive intent, with reference to the attached drawings, in which.

Figure 1:
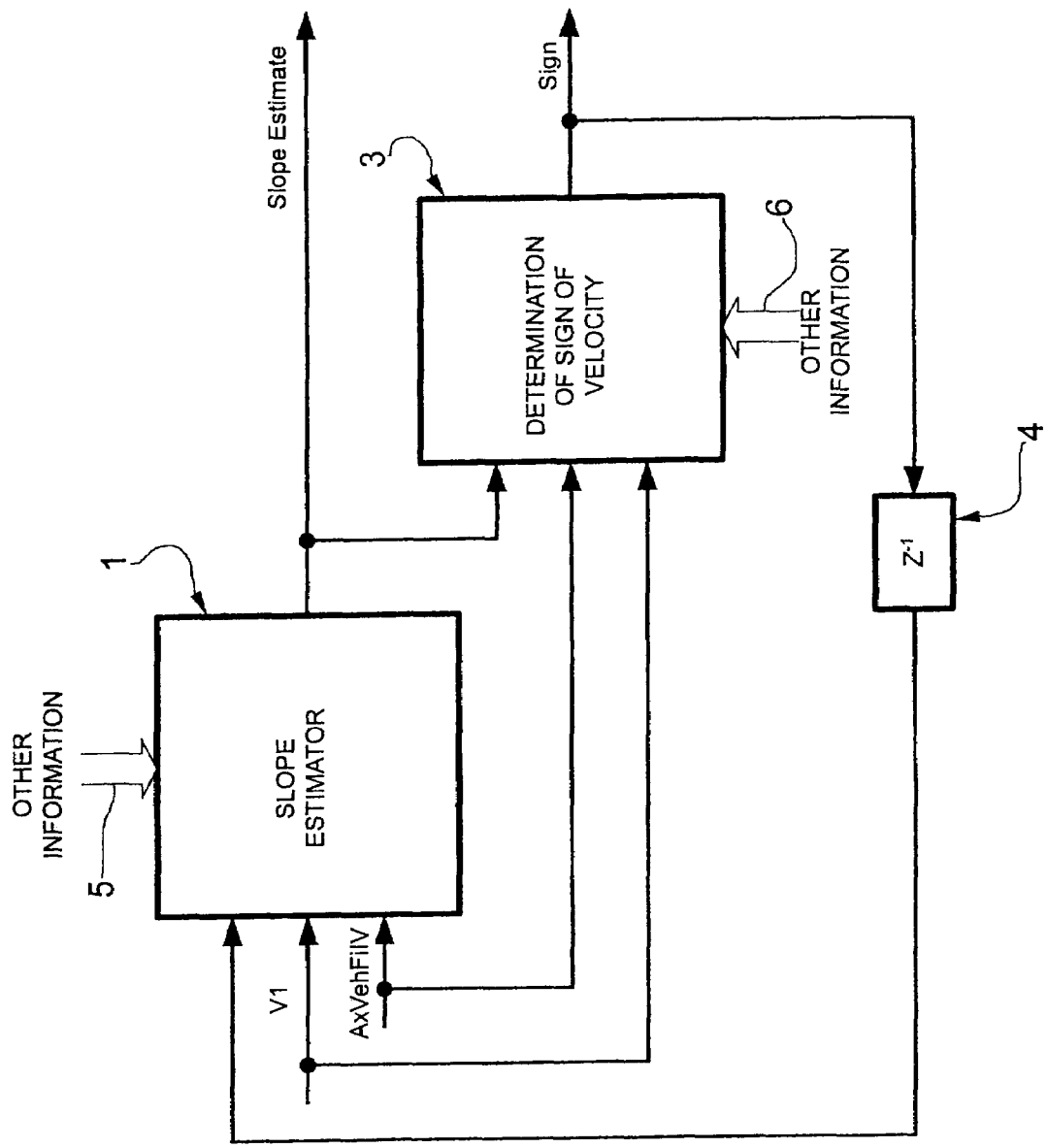
FIG. 1 is a schematic diagram of the complete algorithm of the method of estimating the road slope according to the invention.

The schematic diagram of the whole algorithm of the method for estimating the road slope is shown in FIG. 1. This algorithm substantially comprises a slope estimation block 1 and a block 3 for determining the sign of the velocity of the vehicle.

The road slope is estimated in the block 1, using a measurement of the longitudinal acceleration AxVehFilV, a data element indicating the velocity of the vehicle V1, and an estimate of the sign of the movement; when the vehicle starts, the slope estimate is used to determine the sign of the movement in the block 3. The sign of the velocity determined in the block 3 is entered into the estimation block 1 through a feedback block 4. As explained more fully below, the algorithm uses other information as well as the velocity and acceleration of the vehicle, as indicated by the arrows 5 and 6 in FIG. 1, in order to improve the estimation performance.

In the latest generation (top range) of vehicles, fitted with sensors capable of measuring the sign of the velocity of the vehicle, the algorithm according to the present invention can be used as a method of analytical redundancy, in other words as information which can be used in case of a fault in the sensors. As explained more fully below, this type of application has been used experimentally in drive-away control for a test vehicle.

Figure 2:
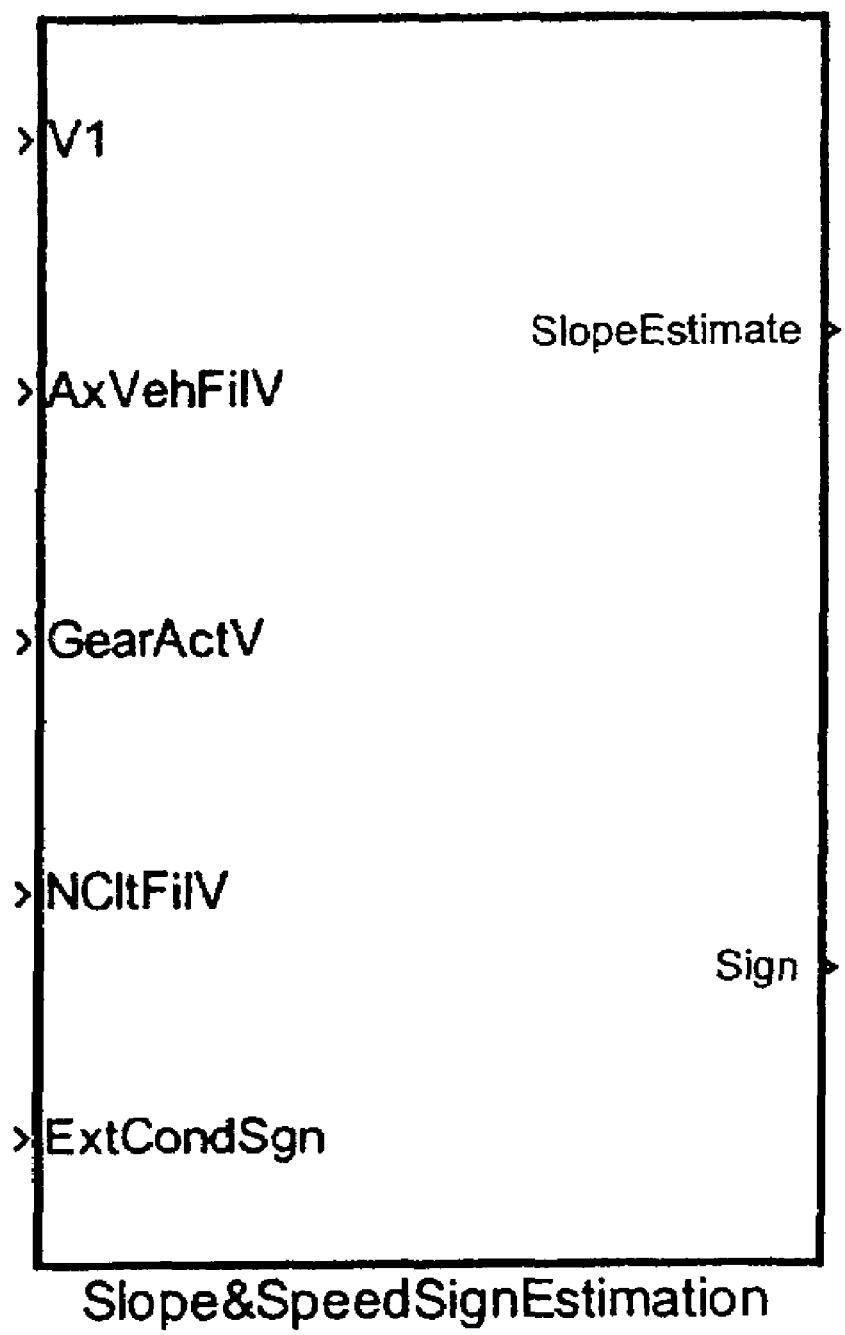
FIG. 2 is a diagram showing the input/output signals of a preferred embodiment of the method of FIG. 1.

The signals supplied at the output and those requested at the input of the algorithm for estimating the slope and the sign of the velocity are shown in the diagram of FIG. 2, and listed below:

- a signal V1 (originating for example from a CAN message relating to an anti-skid system (ASR) of the vehicle), which represents the velocity of the vehicle, which is generally but not exclusively calculated on the assumption that the wheels are not slipping, by multiplying the mean of the angular velocities of the non-driving wheels (those least subject to slipping) by their radius;
- a variable AxVehFilV, indicative of the measurement supplied by the accelerometer, preferably filtered;
- an input NCltFilV, which represents the angular velocity of a primary shaft of the gearbox (hereafter termed the "gearbox primary") of the vehicle, preferably filtered and expressed in RPM (revolutions per minute);
- a signal GearActV, which provides the information on the gear engaged and which can only take the form of a whole number (for example, 0 indicates neutral, 1 indicates first gear, . . . , 7 indicates reverse);
- a condition ExtCondSgn, which provides information on the direction of rotation of the primary in relation to the direction of rotation of the engine in the proximity of speed synchronization during drive-away. It is used to validate or correct the estimate of the sign of the velocity, to enable the clutch to be engaged;
- an output StimaPend, which represents the estimate of the slope, supplied for example as a percentage in the form $100 \tan(\alpha)$;
- a variable Segno, which indicates the sign of the velocity of the vehicle and is, for example, −1 if the vehicle is reversing, 1 if the vehicle is moving forwards and 0 if the vehicle is stationary or if the sign has not yet been recognized.

Theoretically, the information on the gear engaged and on the angular velocity of the gearbox primary, supplied by the signals GearActV and NCltFilV respectively, is not indispensable for the estimation of the slope and the recognition of the sign of the velocity. However, as explained below, the signals NCltFilV e GearActV are preferably used by the algorithm according to the present invention in order to increase the speed and reliability of the estimation of the slope and the recognition of the sign.

Table 1 below shows, by way of example, the specifications for the input and output signals used in the present description.

TABLE 1

| Name | Description | Range | Accuracy | Note |
| --- | --- | --- | --- | --- |
| INPUT SIGNALS | | | | |
| V1 | Velocity of the vehicle | 0 ÷ 512 km/hr | 0.0125 km/hr | calculated from the mean velocity of the non-driving wheels |
| AxVehFilV | Longitudinal acceleration | −1.8 ÷ 1.8 g | $8.7 \cdot 10^{-4}$ g | the accelerometer measurement filtered at 10 Hz (nom. scale factor 1 V/g) |
| GearActV | Gear engaged | 0 ÷ 7 | 1 | 7: reverse 0: neutral |
| ExtCondSgn | External conditions signal | 0 ÷ 1 | 1 | 1: engine speed synchronized with the speed of the gearbox primary or wheel slip 0: other |
| NCltFilV | Angular velocity of the gearbox primary | 0 ÷ 15 000 RPM | 1 RPM | |
| OUTPUT SIGNALS | | | | |
| StimaPend | Estimate of road slope | −100 ÷ 100% | | 100 * tan α |
| Segno | Estimate of sign of movement | −1, 0, 1 | 1 | −1: reversing 0: vehicle stationary 1: forward movement |

Figure 3:
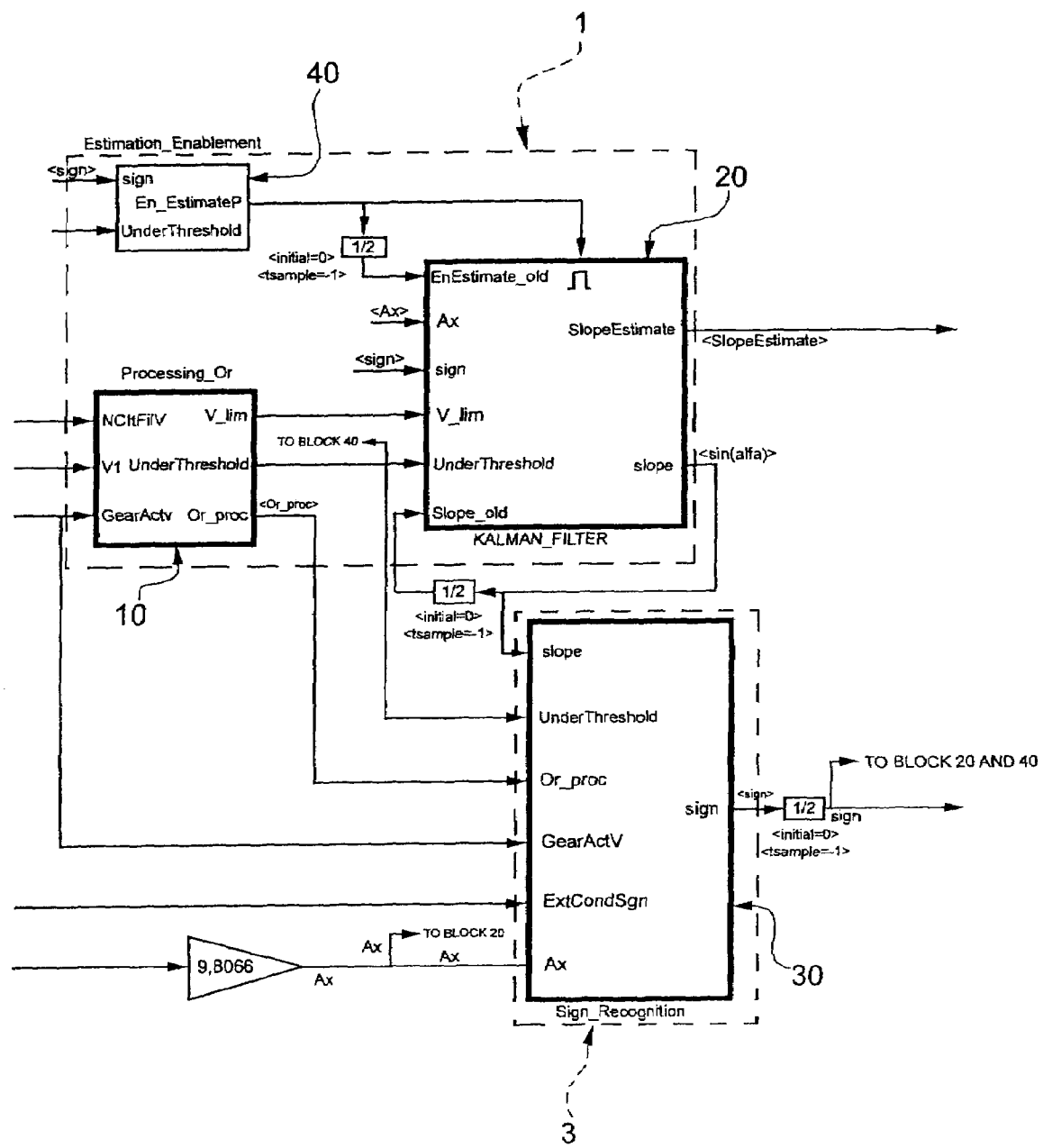
FIG. 3 is a diagram of a preferred embodiment of the method of FIG. 1.

The first level of the block diagram of a preferred embodiment of the method according to the invention for estimating the road slope and recognizing the sign of the velocity is shown in FIG. 3.

In logical terms, the algorithm comprises four calculation blocks, 10, 20, 30, and 40:

1. A block 10, called Processing_Or, processes the measurements of the angular velocity of the wheels V1 and of the gearbox primary NCltFilV, and supplies at its output the information on the velocity of the vehicle and a signal SottoSoglia which indicates whether the vehicle is stationary or moving. This signal processing is carried out in order to make the whole algorithm as reliable and fast as possible.

2. A block 40, called Estimation_Enablement, supplies the signal for enabling the calculation of the estimate of slope; in particular, this signal commands the Kalman filter not to update the estimate of slope when the vehicle is moving but the direction of movement has not yet been recognized.

3. A block 20, called Kalman_Filter, supplies the information on the estimate of the road slope on the basis of the information on the velocity of the vehicle, on the sign of the movement, and on the measurement supplied by the accelerometer.

4. A block 30, called Sign_Recognition, determines the sign of the velocity of the vehicle.

The aforementioned four logical blocks must be executed sequentially at each sampling pass in the order in which they are listed.

The road slope can be estimated by using the information on the velocity of the vehicle, on the torque transmitted to the wheels and on the resistant torque. A more accurate estimate of the inclination of the road is obtained by measuring the longitudinal component of acceleration of the vehicle, by means of a suitably orientated accelerometer (not shown). This approach is the one used by the estimation algorithm according to the invention.

Disregarding the contribution due to the pitching of the vehicle and the effect of the lateral acceleration, the measurement of the longitudinal accelerometer can be described as the sum of two contributions:

$$A_x = \dot{v} + g \sin \alpha \quad (1)$$

where $\dot{v}$ denotes the longitudinal acceleration component of the vehicle along the road profile, g is the gravitational acceleration, and $\alpha$ represents the angle of inclination of the road.

The problem of estimating the road slope on the basis of the measurements made by the accelerometer and the velocity sensor of the vehicle was tackled by using a Kalman filter, based on a mathematical model described below. The measurement supplied by the accelerometer is represented by a model similar to equation (1), which additionally describes the disturbance in the sensor as coloured noise $x_3$, produced by filtering a white noise $v_2$ with a first-order filter having a pole $p_3$:

$$\dot{x}_1 = -gx_2 + A_x + x_3 \quad (2)$$

$$\dot{x}_3 = -p_3 x_3 + v_2 \quad (3)$$

where $x_2 = \sin \alpha$, $x_1 = v$. In turn, the variation of slope is modelled with a first-order dynamic:

$$\dot{x}_2 = -p_2 x_2 + v_1 \quad (4)$$

By grouping equations (2)-(4) in a matrix, we obtain the model in state-space form $$\dot{x} = A \cdot x + B_u \cdot u + B_v \cdot v \quad (5)$$

$$= \begin{bmatrix} 0 & -g & 1 \\ 0 & -p_2 & 0 \\ 0 & 0 & -p_3 \end{bmatrix} \cdot \begin{pmatrix} x_1 \\ x_2 \\ x_3 \end{pmatrix} + \begin{bmatrix} 1 \\ 0 \\ 0 \end{bmatrix} u + \begin{bmatrix} 0 & 0 \\ 1 & 0 \\ 0 & 1 \end{bmatrix} \cdot \begin{pmatrix} v_1 \\ v_2 \end{pmatrix}$$

$$m = C \cdot x + D_w \cdot w = [1 \ 0 \ 0] \cdot x + w \quad (6)$$

where the input u consists of the accelerometer measurement and m represents the measurement of the velocity of the vehicle corrupted by a Gaussian white noise w.

Figure 4:
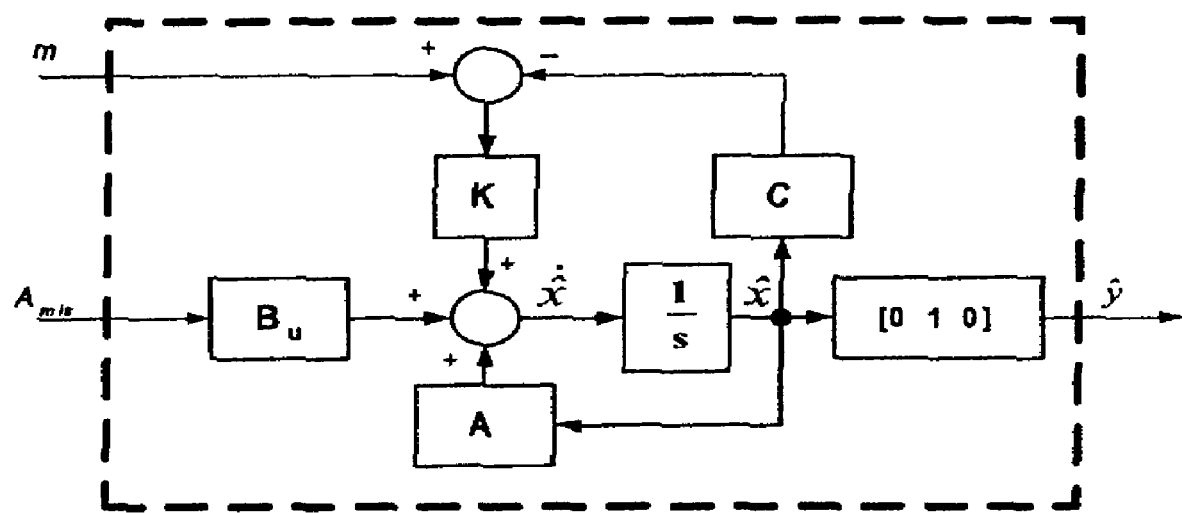
FIG. 4 is a (conceptual) block diagram of a Kalman filter used in the method of FIG. 3.

The Kalman filter projected on to the aforementioned mathematical model is described by the block diagram of FIG. 4 and by the equations $$\dot{\hat{x}} = A \cdot \hat{x} + B_u \cdot u + K(m - C \cdot \hat{x})$$

$$\hat{y} = [0 \ 1 \ 0] \cdot \hat{x} \quad (7)$$

Table 2 below shows the numerical values of the Kalman filter designed ad hoc to estimate the slope in a specified test vehicle, in order to improve the drive-away control performance. These numerical values are therefore provided purely by way of example. The same numerical values were used for the experimental tests described below.

TABLE 2

| $p_2$ (in s$^{-1}$) | $p_3$ (in s$^{-1}$) | K |
|---|---|---|
| $2\pi (3 \cdot 10^{-4})$ | $2\pi (10^{-3})$ | $[1 \ -0.05 \ 0.007]^T$ |

An example of a simulation providing an indication of the speed with which the Kalman filter described above estimates the road slope is described below. It is important to emphasize that an increase in the speed of the estimation of the variations of slope by the Kalman filter is accompanied by an increase in its sensitivity to disturbances such as the pitching of the vehicle or the coupling of the lateral acceleration to the measurement supplied by the longitudinal accelerometer.

Figure 5:
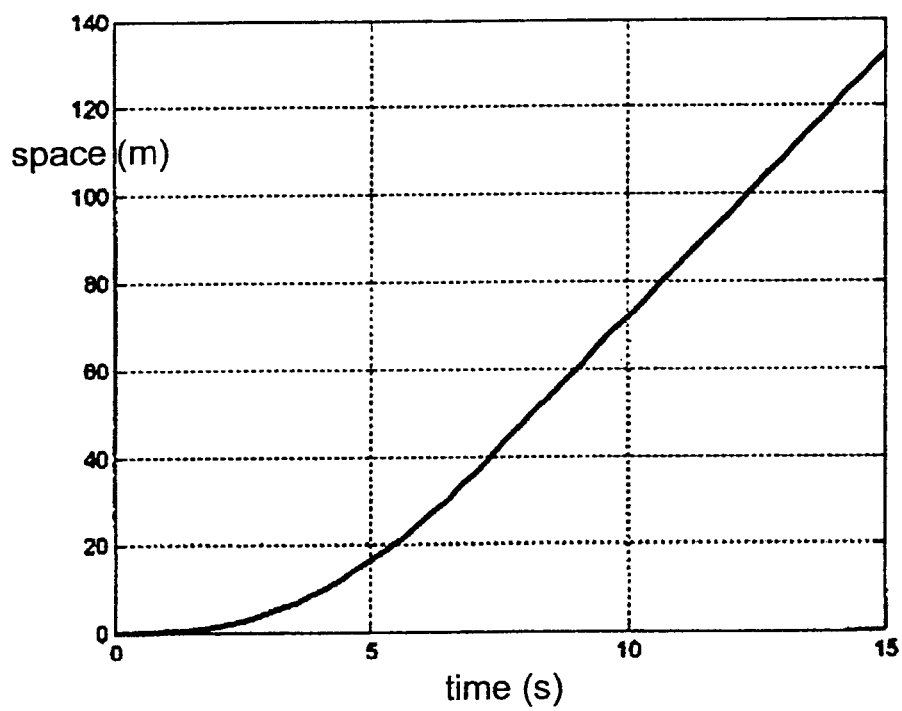
FIGS. 5 to 9 are graphs showing the results of a simulation conducted by using the method of FIG. 4.
Figure 6:
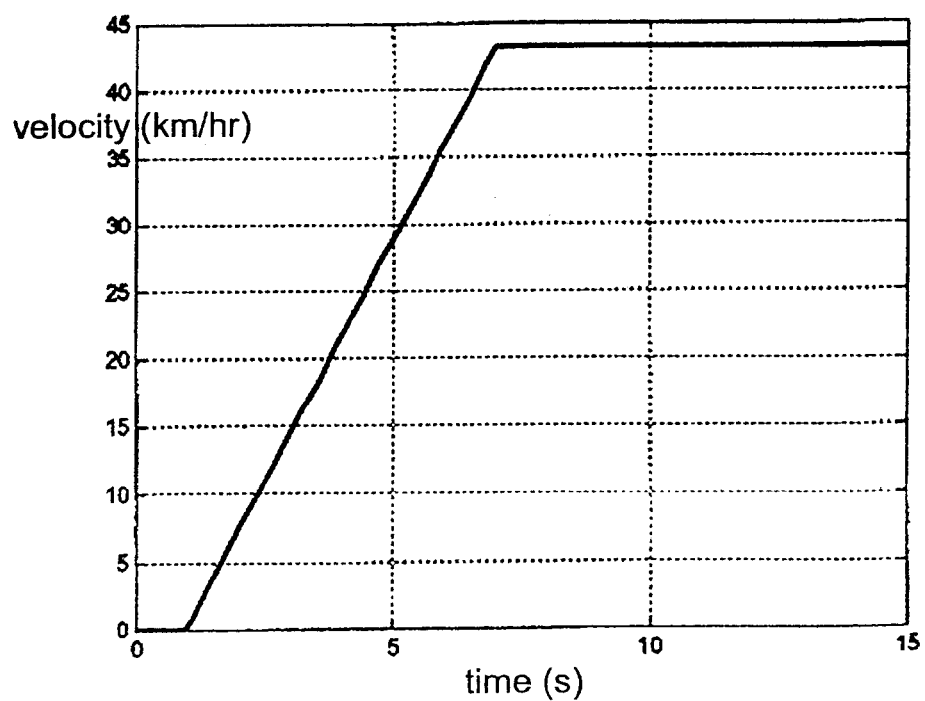
Figure 7:
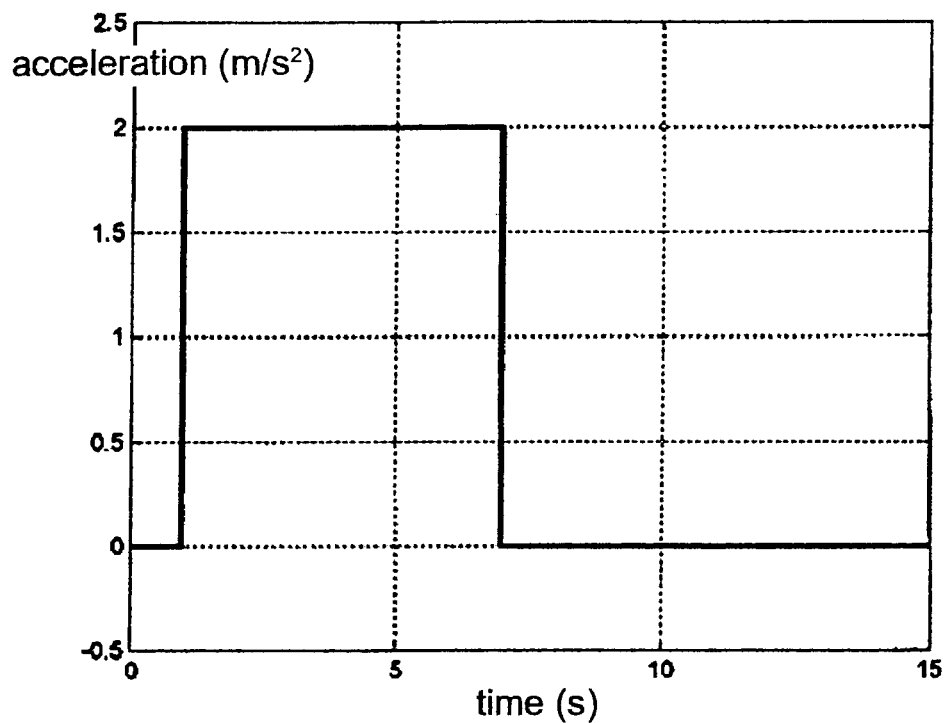

In particular, the simulation assumes a point mass which is initially stationary, and which at the instant t=1 s is put into motion with a constant acceleration of 2 m/s² up to the instant t=7 s, after which the mass proceeds at constant velocity. FIG. 5 represents the space through which the moving body passes, FIG. 6 represents the velocity, and FIG. 7 represents the acceleration. A 10% step variation of the road slope is simulated at the instant t=5 s.

Figure 8:
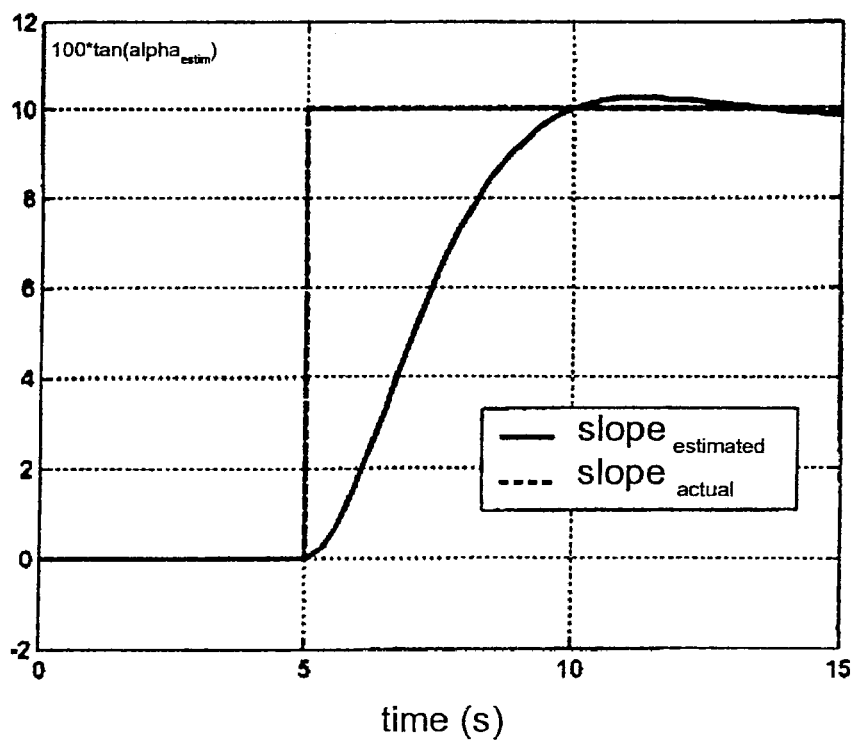
Figure 9:
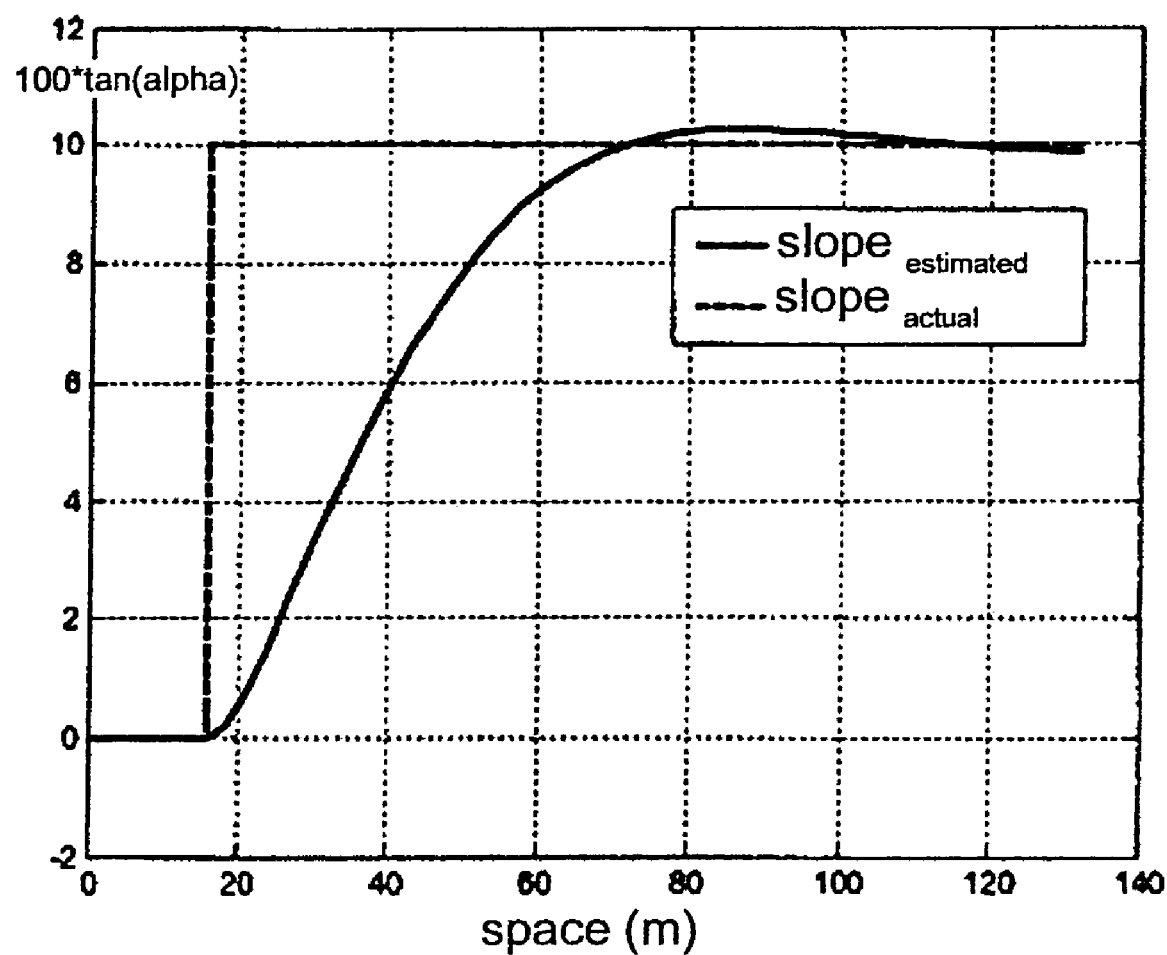

In order to show only the speed of convergence of the slope estimate supplied by the Kalman filter, the response dynamics of the sensors and any noise have been disregarded; the Kalman filter has therefore been made to operate with ideal velocity and acceleration. The time required for the estimator to supply 90% of the exact value of the slope is approximately 3.5 s (see FIG. 8), which at the assumed velocity corresponds to a space traversed of approximately 40 m (see FIG. 9). The speed of convergence of the Kalman filter which was examined is not very high, but it makes the estimator suitable for use in drive-away control, since it is associated with low sensitivity to the pitching of the vehicle and to disturbances affecting the accelerometer. For drive-away control, it is important to have a reliable estimate of the road slope when the vehicle starts to move.

A high convergence velocity of the Kalman filter would result in lower robustness of the whole algorithm, since the disturbances affecting the accelerometer would affect the procedure for recognizing the direction of movement of the vehicle. In fact, the estimation of the slope requires correct information on the sign of the movement, which in turn is estimated by a specific sub-system. In this case, the procedure for recognizing the sign of the velocity uses the value of slope estimated at the instant at which the start of the vehicle's movement is detected, and therefore the disturbances of the accelerometer which affect the estimation of the direction of movement are those which act before the aforementioned instant and are not completely attenuated by the Kalman filter.

The determination of the sign of the velocity requires a certain period of time, during which the Kalman filter does not update the estimate of slope; the acceleration of the movement of the vehicle during the phase of recognition of the sign is therefore not interpreted as a variation of slope and therefore does not generate errors in the estimation of the slope.

Figure 10:
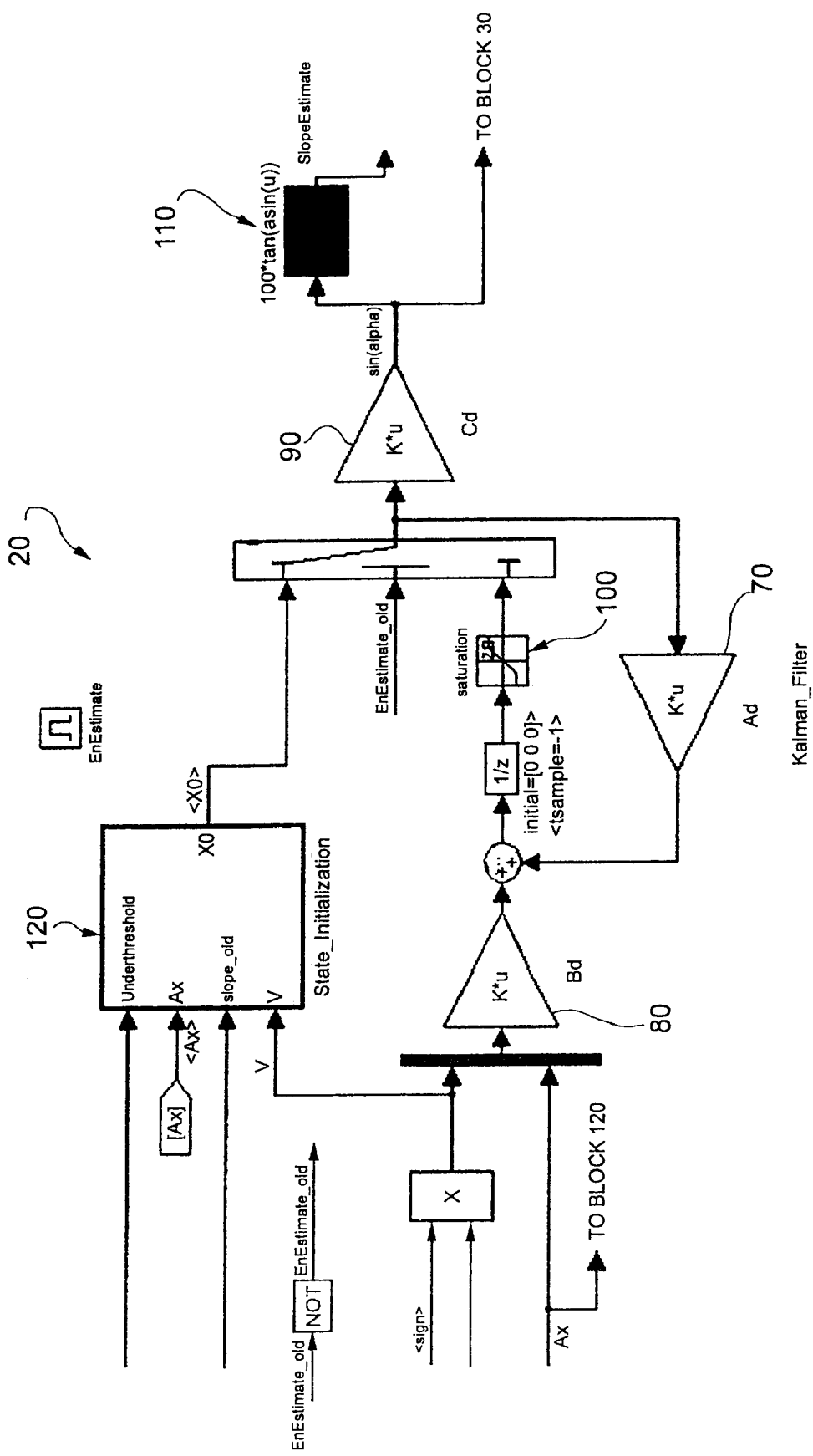
FIG. 10 is a (detailed) block diagram of the Kalman filter shown in FIG. 4.

The Kalman filter described above showing the differential equations in continuous time was discretized, thus producing the block Kalman_Filter 20, the block diagram of which is shown in FIG. 10. This system implements the following mathematical model:

$$\hat{x}(k) = A_d \cdot \hat{x}(k-1) + B_d \cdot u_d(k-1)$$

$$\hat{y}(k-1) = C_d \cdot \hat{x}(k-1) \quad (8)$$

where the matrices $A_d$, $B_d$ and $C_d$, which are implemented by respective transfer blocks indicated respectively by 70, 80 e 90 in FIG. 10, are produced by the discretization of the Kalman filter; k indicates the sampling instant; the input $u_d$ is a vector whose first element is the measurement of the velocity of the vehicle expressed in m/s and corrected with the information on the sign, and whose second element is the measurement of longitudinal acceleration expressed in m/s$^2$; and $\hat{x}$ is the estimated states vector, ordered as described above.

The information on the road slope is supplied by means of the signals pend and StimaPend, which represent, respectively, the sine of the angle of inclination of the road and the slope as a percentage:

$$\text{pend} = \sin \alpha \quad (9)$$

$$\text{StimaPend} = 100 \cdot \tan \alpha \quad (10)$$

A saturation block 100 has been inserted into the system of FIG. 10 to avoid supplying excessively high values of slope in case of malfunction of the algorithm or of the sensors used by it. The maximum and minimum saturation values set for the slope are +30% and −30%, while the other two states are not saturated. A conversion table 110, which converts the estimate of the sign of the angle of inclination of the road to a percentage, has been added in series with the gain matrix $C_d$ 90. The table supplies at its output the variable StimaPend calculated as follows:

$$\text{StimaPend} = 100 \cdot \tan(a \sin(u))$$

The block 20 which models the Kalman filter is enabled by the signal EnStima: if this enabling signal takes a value of one, the estimation of the slope is enabled; conversely, when EnStima has a zero value, the estimate is not updated and a constant value, equal to the slope estimated at the instant of disabling, is supplied at the output. The Kalman filter is disabled only during the phase of recognition of the sign of the velocity, in other words in the phase in which it has been detected that the vehicle is in movement, but the direction of movement is not yet known.

Figure 11:
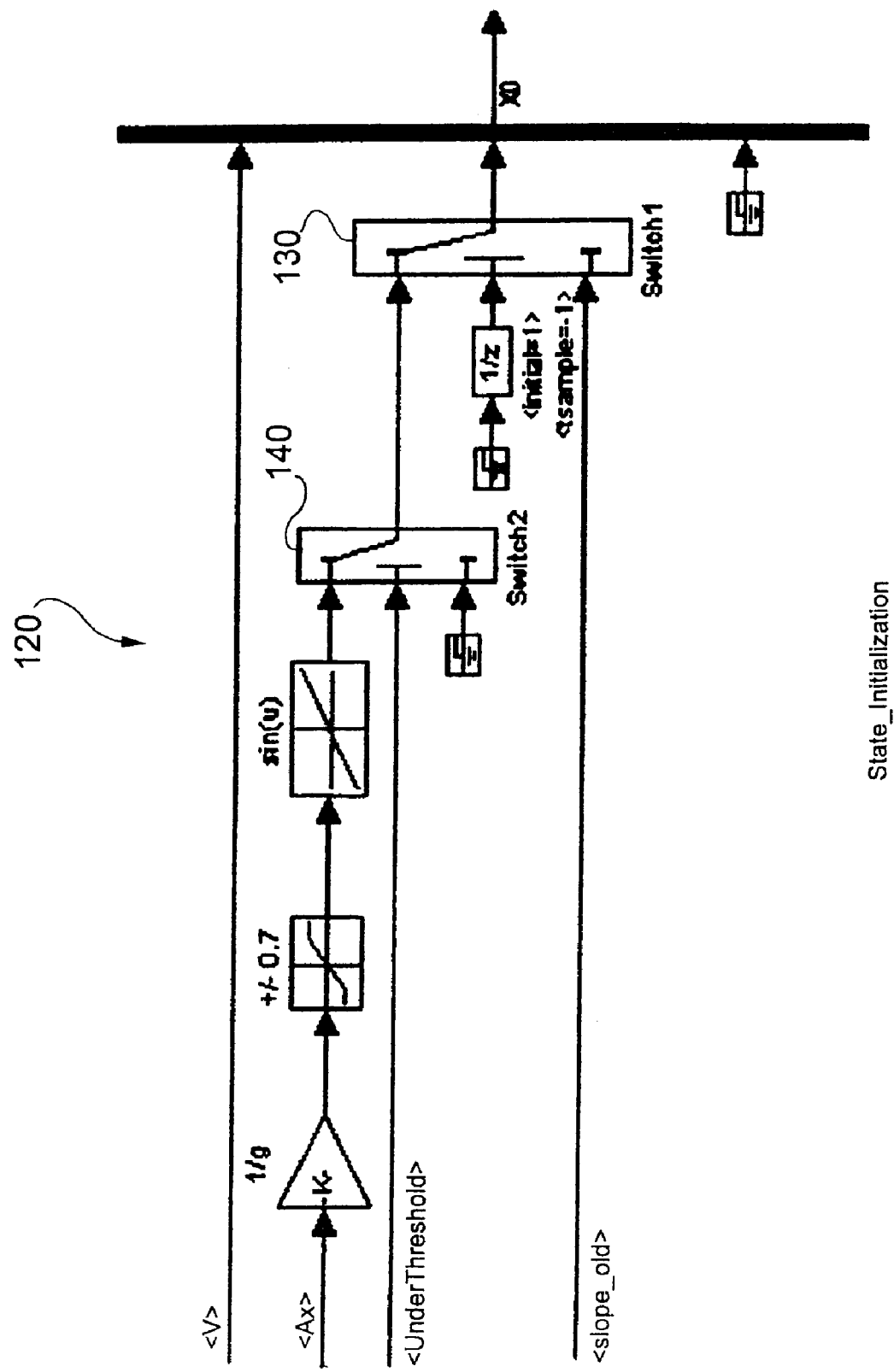
FIG. 11 is a block diagram showing the initialization of the states of the Kalman filter of FIG. 4.

The Kalman_Filter block 20 also comprises a block 120, called State_Initialization, which calculates the value X0 which the state vector of the Kalman filter must have at the instant of activation of the block. The initialization procedure is shown in FIG. 11, where the first and the third state of the Kalman filter represent, respectively, the estimated velocity and the accelerometer error, and are always initialized, respectively, with the velocity measurement and with a zero value; the second state represents the estimated slope and can be initialized in two different ways, according to whether or not the system is at the instant of starting. These last two situations are discriminated by a block 130, called Switch1, which in a generic activation of the Kalman filter sets the initial slope to a value equal to that of the preceding sampling phase. However, at the instant of start of the system, the initial value of the slope is defined by a block 140, called Switch2, which sets a zero value if the vehicle is moving, or the corresponding value of slope calculated by equation (1), assuming that $\dot{v}=0$, if the velocity of the vehicle is less than a certain specified threshold. Because of this setting of the initial states, the Kalman filter already supplies a slope value close to the correct one when the system is started, if the vehicle is stationary.

This type of initialization is useful if the measurement supplied by the accelerometer is reliable at the instant of activation of the system.

The method according to the invention comprises an algorithm which estimates the sign of the velocity of the vehicle, mainly by using the estimate of the slope with the vehicle stationary and the measurement of the longitudinal acceleration. It must be stressed from the outset that the information on the sign of the velocity supplied by the algorithm is an estimate, and is therefore not absolutely reliable.

The basic principle used to estimate the sign of the movement of the vehicle is the calculation of the velocity on the basis of information which also enables the sign of the velocity to be determined. As mentioned above, a known way of calculating the velocity including the information on the sign is to use the simplified dynamic model $$J_{eq} \dot{\omega}_{wheels} = C_T - C_R - Rmg \sin \alpha \quad (11)$$

where $J_{eq}$ represents the equivalent inertia of the vehicle with respect to the wheels; $C_T$ is the torque transmitted to the wheels; $C_R$ indicates the resistant torque at the wheels, including the contribution of the brakes, the friction of the tyres and the aerodynamic resistance of the vehicle; R represents the radius of the wheels; m is the mass of the vehicle; and $\omega_{wheels}$ indicates the mean angular velocity of the non-driving wheels. The second member of equation (11) represents the balance of the torques acting on the vehicle, which, when integrated and divided by the equivalent inertia, provides an estimate of the angular velocity of the wheels. In order to determine the sign of $\omega_{wheels}$ correctly, it is not essential to calculate the exact value of the second member, but it is sufficient for its sign to have an average degree of accuracy. The variables present in the relation (11) which are known with the greatest uncertainty are the transmitted torque $C_T$, the resistant torque $C_R$ and the mass of the vehicle. This is because the torque $C_T$ in the drive-away phase is derived from the torque transmitted by the clutch, which is subject to wear, and is therefore known with a relative uncertainty of up to 50%; the torque $C_R$ includes the contribution of the brakes, which in general is neither measured nor estimated; the total mass can vary by several hundreds of kilograms.

Since it is desired to discriminate between the positive and negative velocities, the uncertainty with which the variables present in the relation (11) are known becomes critical for low values of angular acceleration $\dot{\omega}_{wheels}$, in other words when the uncertainty can lead to an error in the sign of the total result of the balance of torques (the second member of the simplified model of the relation (11)).

A more reliable estimate of the direction of movement of the vehicle can be obtained by calculating the velocity of the vehicle by means of the model $$\dot{v}=A_x-g\sin\alpha \quad (12)$$

which uses the measurement of the longitudinal accelerometer and an estimate of the road slope. The calculation of the velocity with this model is more accurate, since there are fewer variables in operation and their accuracy is greater. The estimate of slope used in equation (12) is that supplied by the Kalman filter, which in turn uses the accelerometer measurement and the information on the sign of the velocity. Thus, in order not to create critical loops in the whole algorithm, it is necessary to store the value of the slope as soon as the vehicle starts to move, and to use this value in equation (12) to determine the sign of the velocity. Until the sign is known, the slope estimation algorithm uses a zero value of velocity.

With this method according to the invention also, the most critical situations are those characterized by very small accelerations, since the uncertainties present can potentially cause a significant and persistent error in the sign of the second member of equation (12) and consequently in the estimation of the sign of the velocity. However, the critical band is much narrower than in the approach which uses the information on the torque, and in any case this problem is considerably mitigated by a number of arrangements explained below.

Using a constant value of slope, equal to the value estimated when the vehicle starts to move, is equivalent to assuming that there are no significant variations of slope throughout the period of recognition of the sign. This assumption is reasonable if we consider the delay with which the vehicle is subjected to a variation of slope (due to its physical dimensions) and the speed of recognition of the sign by the algorithm. In particular, the period of recognition of the sign is of the order of a tenth of a second for high values of acceleration $\dot{\omega}_{wheels}$, while it is generally less than one second for low values of acceleration.

A simple way of determining the direction of the movement is to calculate the velocity of the vehicle by integrating the relation (12) and testing the sign as soon as the modulus of the calculated velocity exceeds a certain predetermined threshold. The presence of the threshold is necessary in order to make the algorithm robust when exposed to any disturbances acting on the accelerometer or uncertainties in the estimation of the slope.

Figure 12:
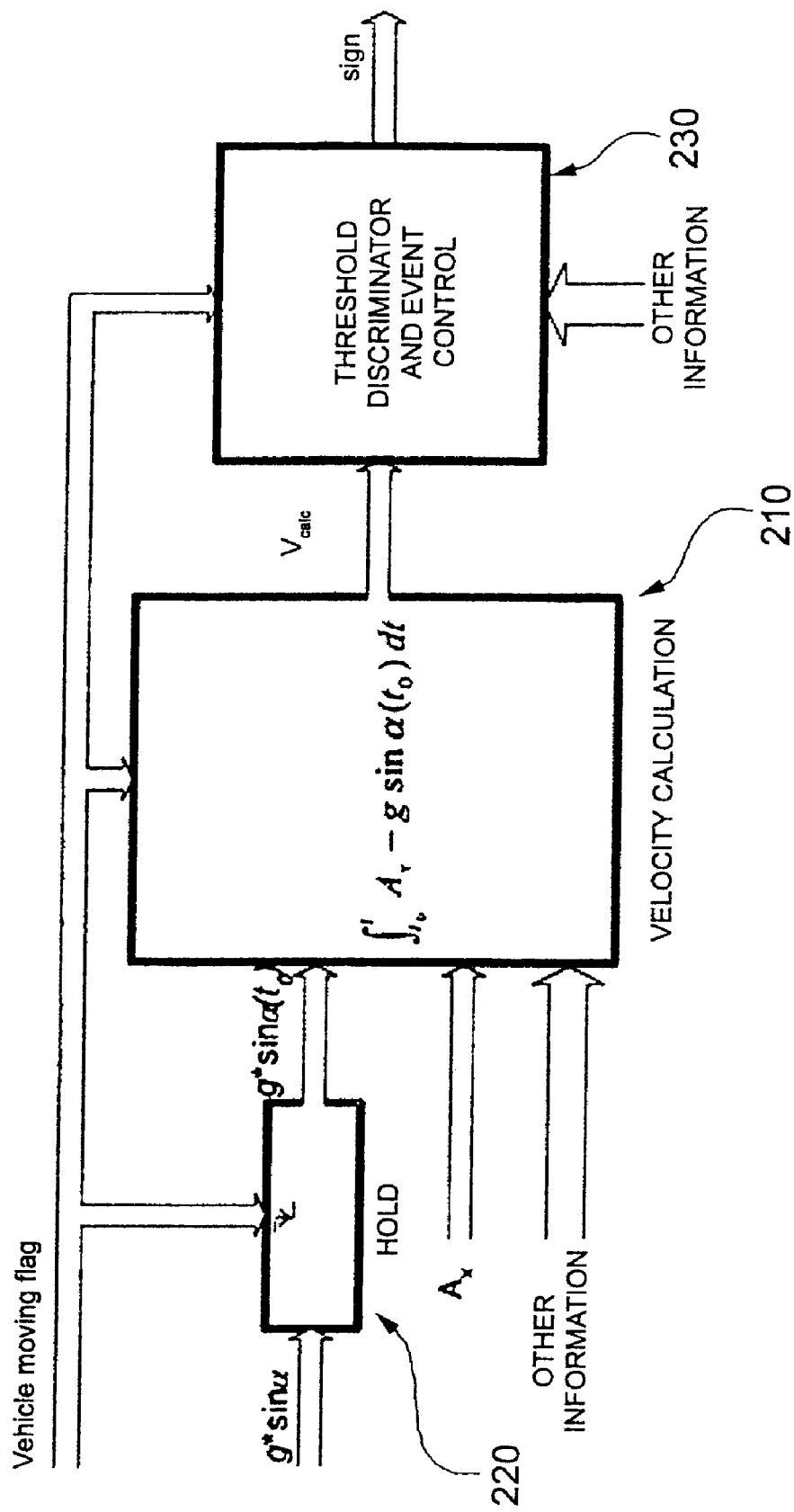
FIG. 12 is a simplified diagram of an algorithm for detecting the sign of the movement.

FIG. 12 shows a schematic diagram of the simplified version of the sign detection algorithm. Briefly, the procedure of estimating the sign can be schematized in the form of three logical blocks 210, 220, 230, coordinated by a signal which identifies the stationary or moving state of the vehicle. If the vehicle is stationary, the subsystem 210 which calculates the velocity $V_{calc}$ supplies a constantly zero output and the whole algorithm yields a zero value as the sign information; at the instant of detection of the starting of the vehicle, the block 220, called HOLD, stores the road slope value and supplies it at the output until the halting of the vehicle is again detected. The block 230, called THRESHOLD DISCRIMINATOR AND EVENT CONTROL, determines the sign of the movement on the basis of the sign of the calculated velocity $V_{calc}$ and other information on the state of the vehicle.

Figure 13:
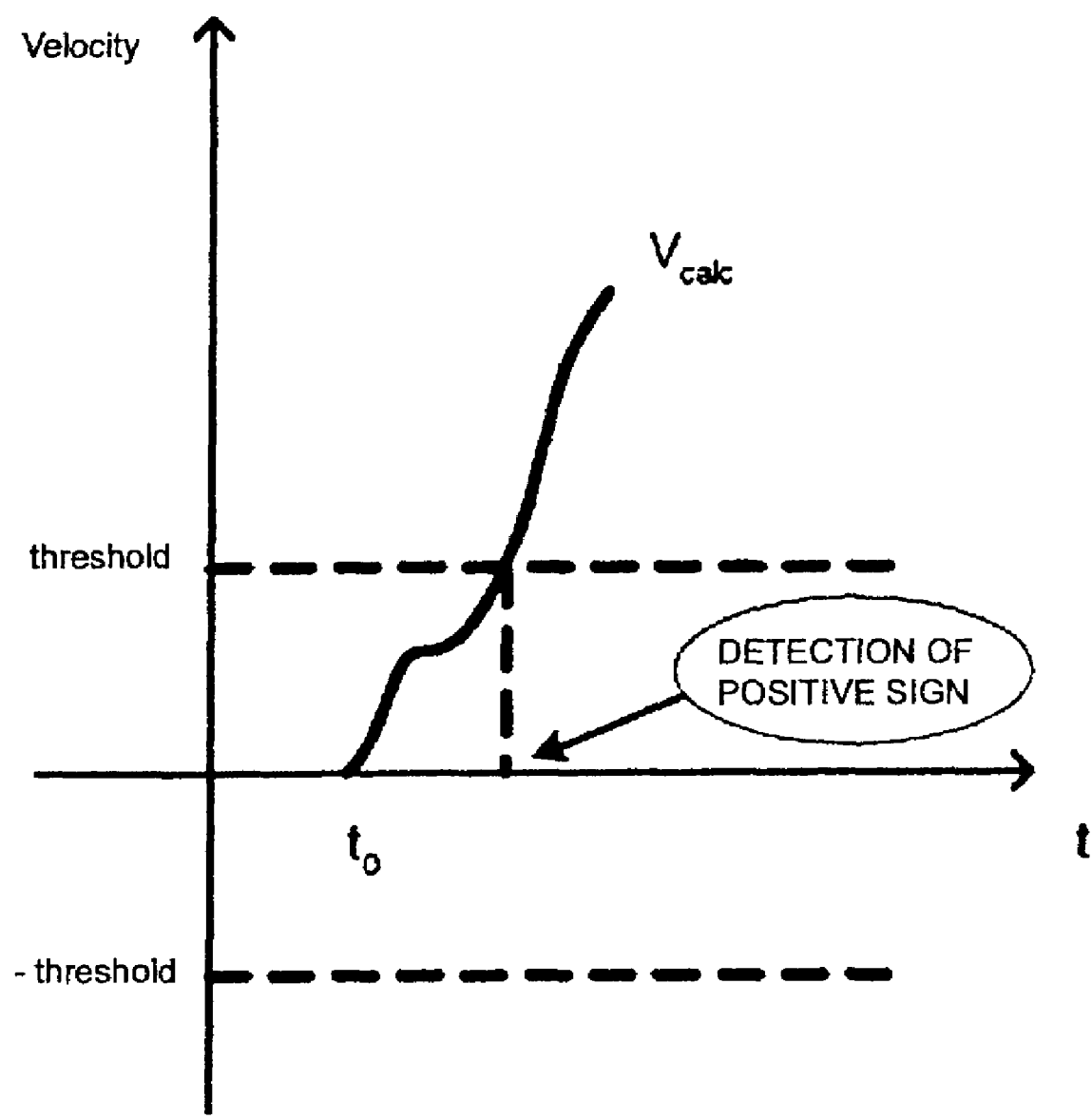
FIG. 13 is a graph which shows an example of calculated velocity when the vehicle is moving.

FIG. 13 shows an example of possible evolution of the variable $V_{calc}$ in the case of a movement of the vehicle, where to indicates the instant at which the start of movement of the vehicle is detected, and threshold represents the velocity below which the sign of $V_{calc}$ is not taken into consideration.

However, the phase of determining the sign executed by the algorithm implemented in a preferred embodiment is somewhat more complicated, but is also faster and more robust than the simple test of the sign of the calculated velocity. This is because the algorithm calculates two angular velocities $$O_{r\_calcP} = O_{r\_proc}(t_0) + \frac{1}{R}\int_0^t (A_x - g\sin\alpha(t_0))dt \quad (13)$$

$$O_{r\_calcN} = -O_{r\_proc}(t_0) + \frac{1}{R}\int_0^t (A_x - g\sin\alpha(t_0))dt \quad (14)$$

where the instant $t_0$ represents the moment of detection of the start of the vehicle's movement; and $O_{r\_proc}$ indicates the information on the modulus of the angular velocity of the wheels supplied by a subsystem which processes in an appropriate way the measurements originating from the sensors of the motor vehicle. The angular velocities of formulae (13) and (14) are used to calculate two variables called residuals:

$$\text{Res}P=O_{r\_proc}-O_{r\_calcP} \quad (15)$$

$$\text{Res}N=-O_{r\_proc}-O_{r\_calcN} \quad (16)$$

which are used directly for the determination of the sign. The sign is estimated as soon as one of the two residuals exceeds a certain predetermined threshold; at this instant, the two residuals are compared with each other, and if the modulus of ResN is greater than ResP the estimated sign will be positive; if the converse is true, the sign will be negative.

Figure 14:
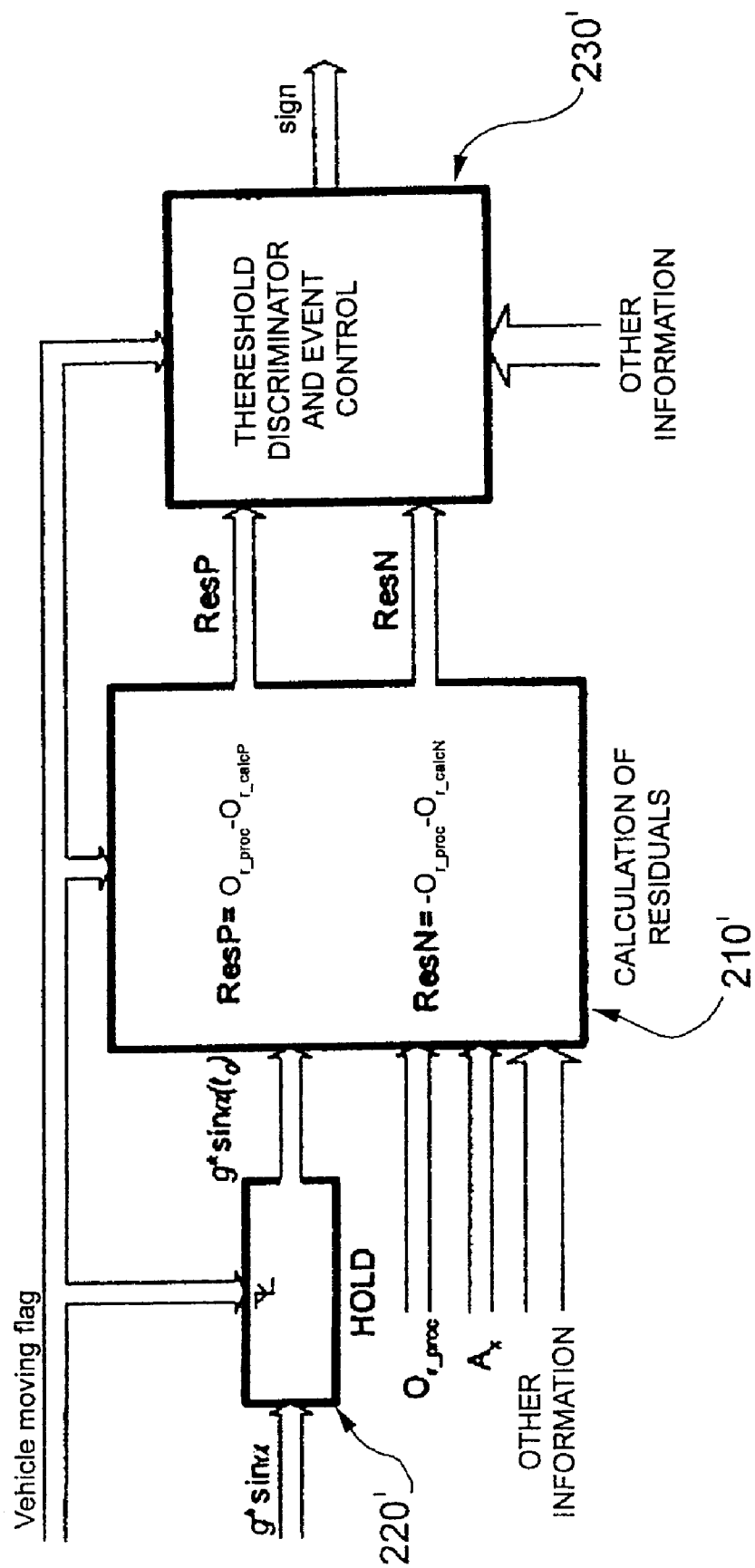
FIG. 14 is a schematic representation of the sign recognition algorithm.

FIG. 14 shows schematically the principal blocks 210', 220', 230' which control the phase of determining the sign in the preferred embodiment illustrated above. In a similar way to what is shown in FIG. 12, the three principal subsystems are coordinated by the signal which identifies the stationary or moving state of the vehicle. When the vehicle is stationary, the subsystem 210' which calculates the residuals supplies constantly zero outputs and the whole algorithm yields a zero value as the sign information. The block 220', called HOLD, freezes the estimated slope value as soon as the start of the vehicle's movement is detected, and supplies it at the output until the vehicle starts again. The stored slope value is used by the block 210', called CALCULATION OF RESIDUALS, to calculate the two variables ResP and ResN, which are monitored by the state machine 230', called THRESHOLD DISCRIMINATOR AND EVENT CONTROL, which, with the aid of other information, determines the sign of the movement of the vehicle.

The models mentioned above with reference to FIGS. 14 and 15 are reported and explained fully in the following paragraphs, with a description of all the input/output variables of the various subsystems.

Figure 15:
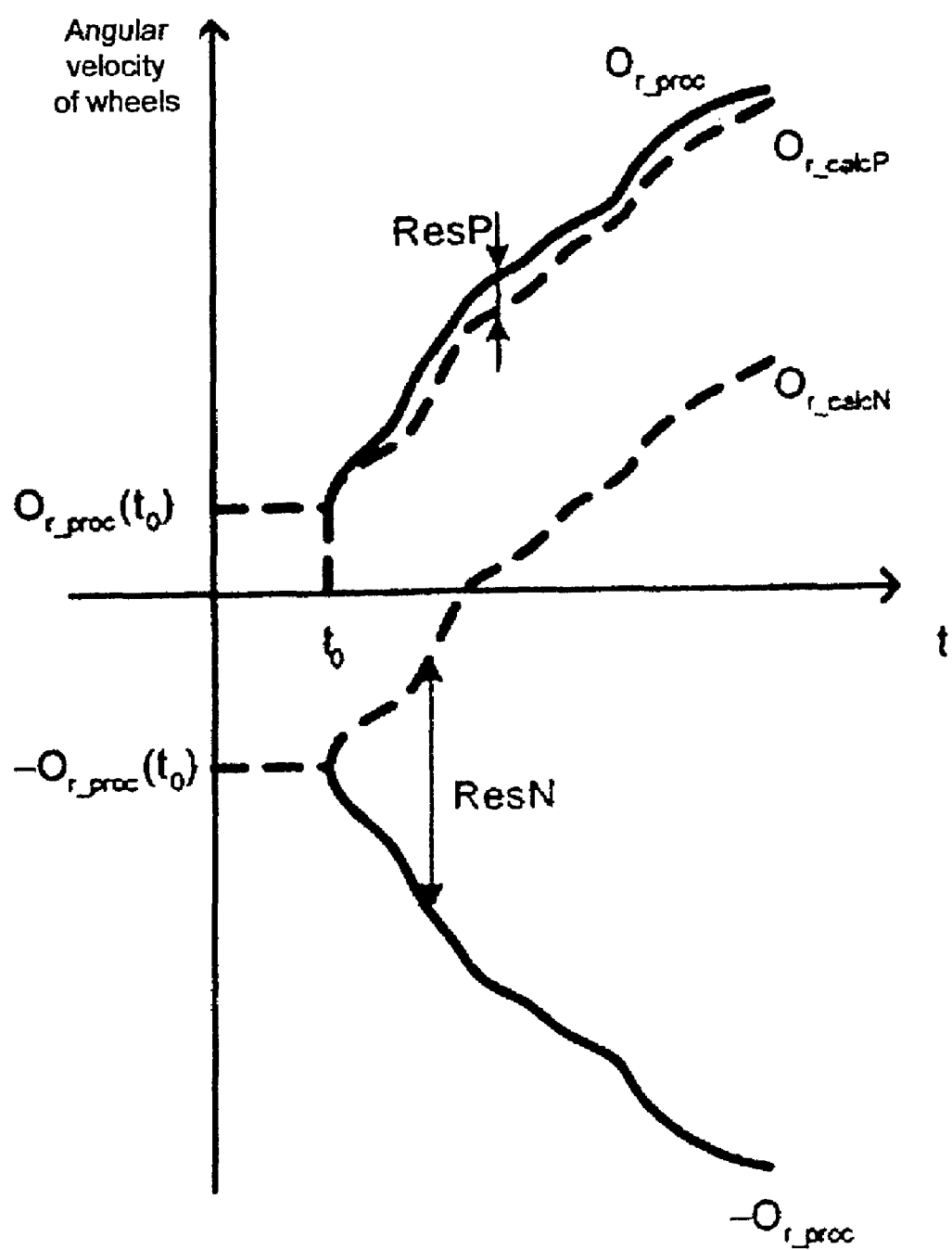
FIG. 15 is a graph which shows an example of calculated velocities when the vehicle is moving.

FIG. 15 shows an example of possible evolution of the fundamental variables for determining the sign of the vehicle, in the case of a movement of the vehicle. The continuous lines $Or_{r\_proc}$ and $-O_{r\_proc}$ represent, respectively, the information on the mean angular velocity of the wheels originating from the sensors and its opposite; the variables in broken lines $O_{r\_calcP}$ and $O_{r\_calcN}$ are the calculated angular velocities which differ from each other by the constant value $2 \cdot O_{r\_proc}(t_0)$; the difference between the measured signals and the calculated signals, indicated by the arrows, are the residuals ResP and ResN. In the illustrated example, the residual ResN diverges rapidly and therefore indicates the direction of movement of the vehicle.

Figure 16:
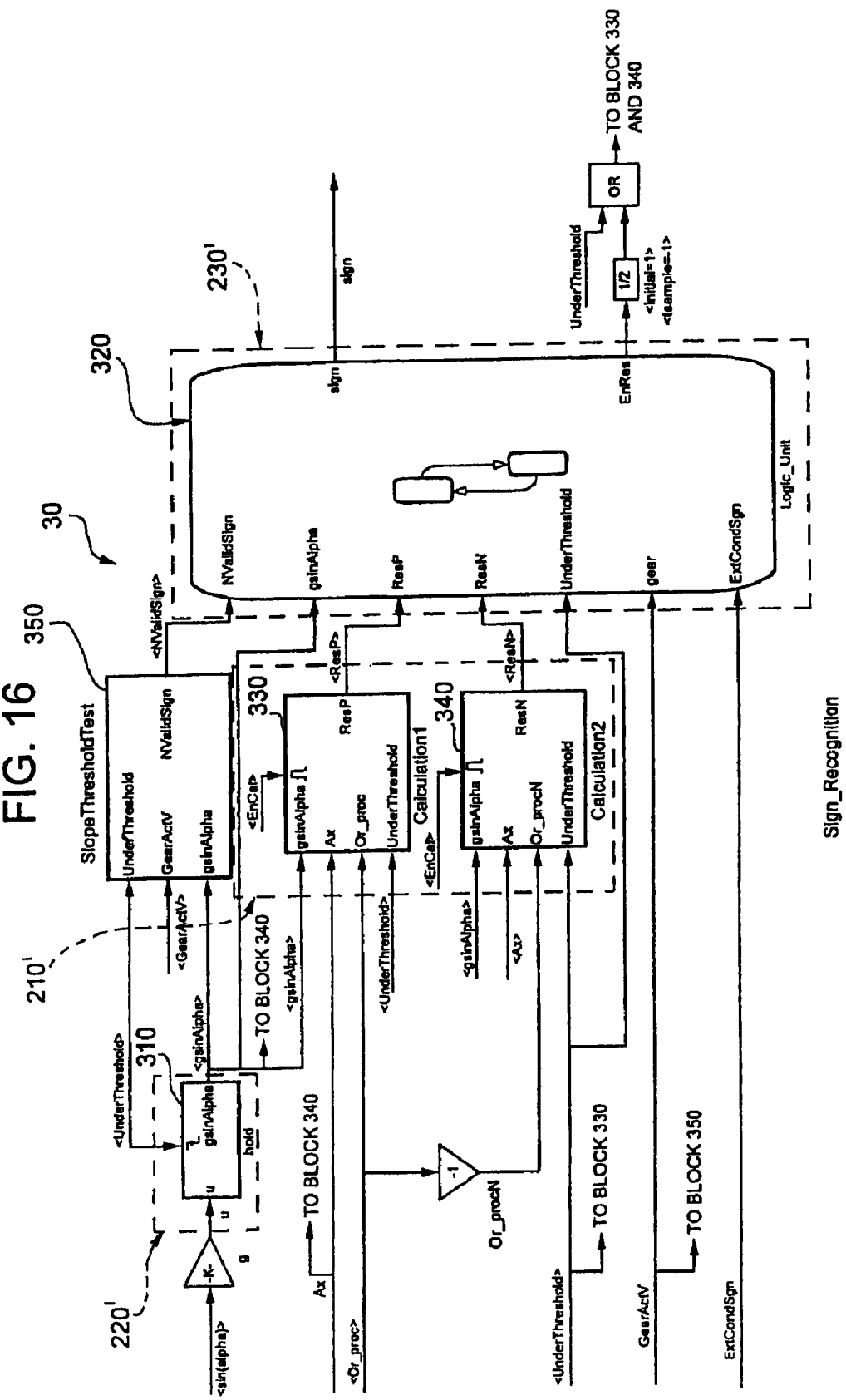
FIG. 16 is a diagram of the block for recognizing the sign of the velocity.

The highest level of the block 30 which estimates the sign of the velocity of the vehicle is shown in FIG. 16; Table 3 below provides a description of the corresponding input/output variables.

The Sign_Recognition block 30 comprises logical sub-blocks 310, 320, 330, 340 and 350. The block 310 implements the HOLD function indicated by 220' in FIG. 14. The block 320 implements the threshold discriminator and event control function indicated by 230', while the blocks 330 and 340 implement the residual calculation function indicated by 210' in FIG. 14. The block 310, called hold, samples and stores the slope estimate at each change of state from 1 to 0 which the variable SottoSoglia undergoes. The signals ResP and ResN are monitored by the state machine 320, called Logic_Unit, only during the phase of determining the sign of the velocity of the vehicle; therefore, in order to minimize the number of calculations executed by the algorithm, the two subsystems 330 and 340, called Calculation1 and Calculation2 respectively, are disabled as soon as the sign of the velocity has been determined. The Calculation1 and Calculation2 blocks are enabled by the signal EnCal, which is the result of the logical OR operation between the signal SottoSoglia and the signal EnRes at the output of the state machine 320. In particular, the signal SottoSoglia has the value 1 when the vehicle is stationary, while the signal EnRes is 1 until the sign of the movement has been determined. If the two Calculation1 and Calculation2 blocks were enabled only by the signal EnRes delayed by a sampling time, the variables ResP and ResN would not be reset if the signal SottoSoglia took the value 1 for a sampling time only.

TABLE 3

| Name | Description | Range | Accuracy | Note |
|---|---|---|---|---|
| INPUT SIGNALS | | | | |
| SottoSoglia | State of vehicle stationary or moving | 0 ÷ 1 | 1 | 0: vehicle stationary 1: vehicle moving |
| Ax | Longitudinal acceleration | ÷ [m/s²] | derived from AxVehFillV | |
| GearActV | Gear engaged | 0 ÷ 7 | 1 | |
| Or_proc | Angular velocity of the wheels | 0 ÷ [rad/s] | | |
| pend | Estimate of slope | −0.7 ÷ 0.7 | | sinα |
| ExtCondSgn | External conditions bit | 0 ÷ 1 | 1 | |
| OUTPUT SIGNALS | | | | |
| sign | Estimate of sign of movement | −1, 0, 1 | 1 | −1: reversing 0: vehicle stationary |

TABLE 3-continued

| Name | Description | Range | Accuracy | Note |
|---|---|---|---|---|
| | | | | 1: forward movement |

The residuals ResP and ResN are calculated by means of the two identical Calculation1 and Calculation2 blocks, 330 and 340, which implement, respectively, the formulae (15) and (16) (see the diagram of the Calculation2 block 340 in FIG. 17); therefore the information received on the angular velocity of the wheels always has a positive sign for the Calculation1 block 330, while for the Calculation2 block 340 it has a negative sign.

Figure 17:
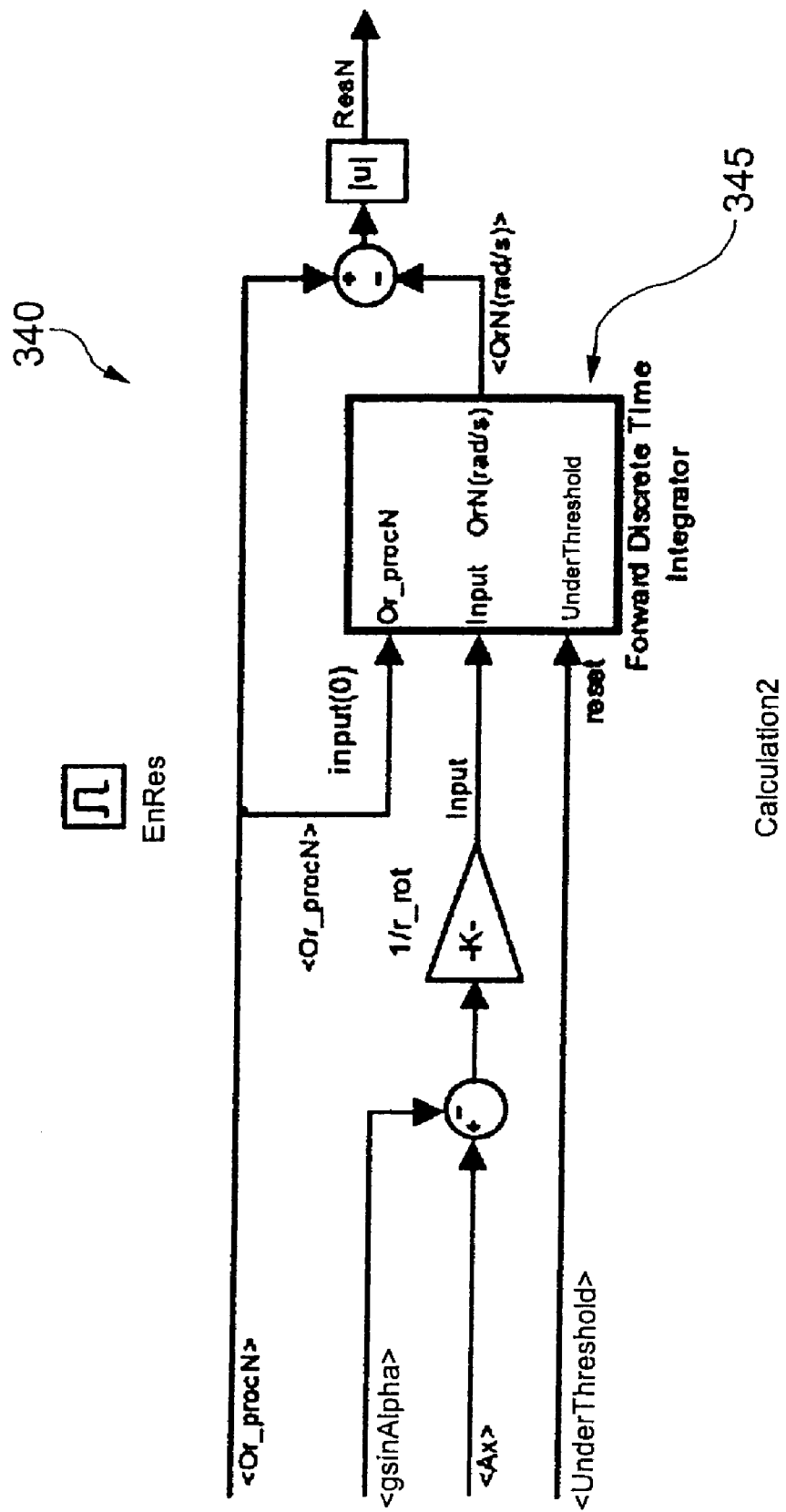
FIG. 17 is a diagram of a sub-block of the block of FIG. 16.

FIG. 17 shows the Calculation2 block 340. It comprises a sub-block 345, called Forward Discrete Time Integrator (illustrated in FIG. 17), which calculates the discrete integral of the input Input and is initialized to the value of Or_proc when the variable SottoSoglia takes the value of 1 (corresponding to the situation in which the vehicle is stationary). The input SottoSoglia therefore represents the reset of the integrator 345, and, since the reset is constantly enabled when the vehicle is stationary, the value of the residuals is zero.

The determination of the sign of the movement of the vehicle on the basis of the calculated residuals and a set of other information is executed by the Logic_Unit block 320, a state machine consisting of three states, each of which corresponds to a possible value of the sign output variable.

Figure 18:
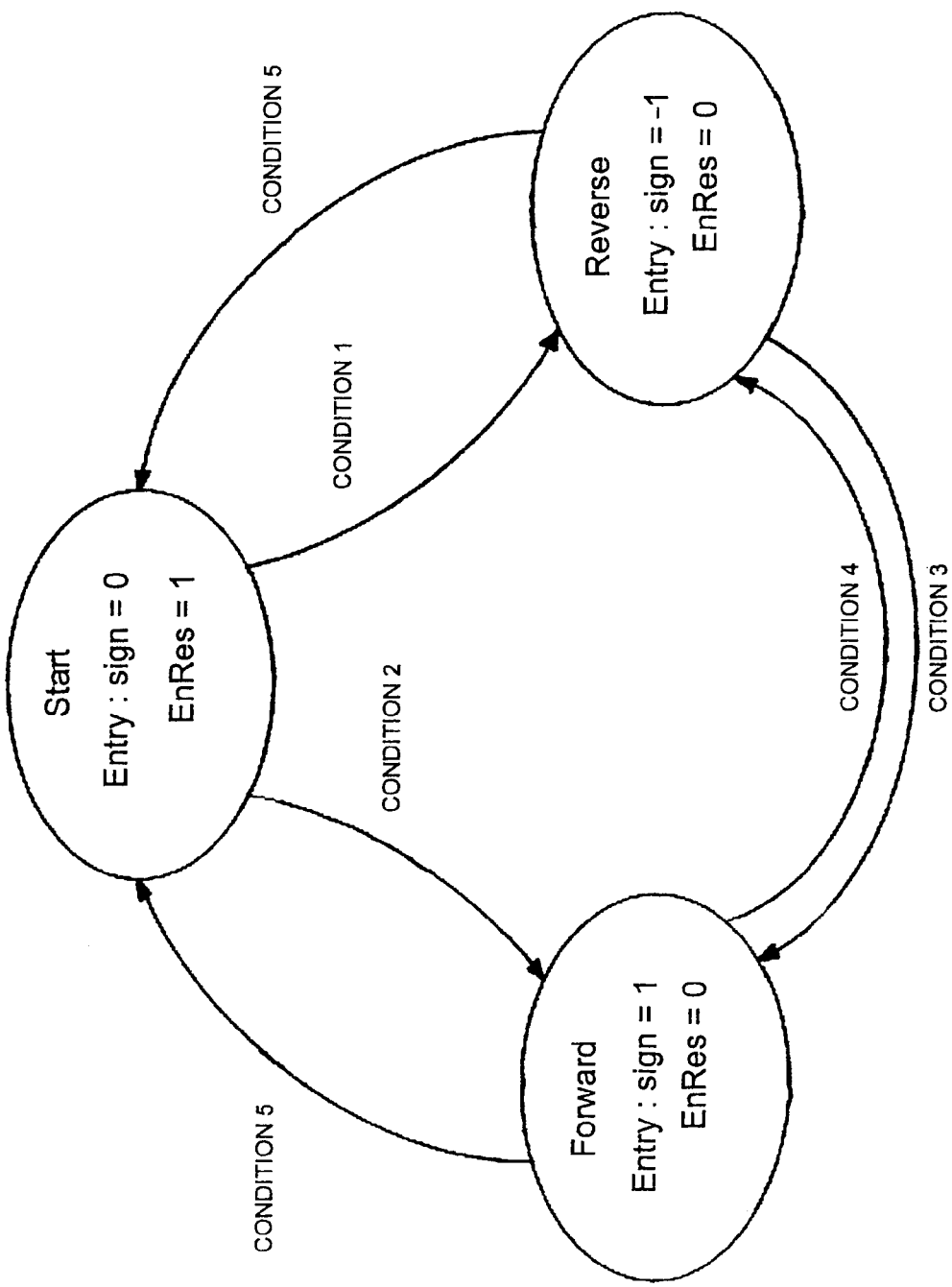
FIG. 18 is a flow diagram of a sub-block of the block of FIG. 16.

The block 320 which implements the state machine is shown in FIG. 18. Theoretically, the sign of the velocity could be determined by monitoring only the residues and the variable (SottoSoglia) which identifies the stationary or moving state of the vehicle. However, in order to make the algorithm as robust and fast as possible, it is preferable to determine the sign on the basis of other information, particularly the following:

a signal gsinalfa, indicating the slope stored when the vehicle starts to move;

a signal NValidSegno, which indicates when the initial slope is below a certain predetermined threshold or when the vehicle is moving during the initialization of the system;

a signal GearActV, representing the gear engaged; and an external condition signal ExtCondSgn: if this is 1, it forces the sign to be compatible with the engaged gear.

When the system is started, the state machine is initialized to the state Start, corresponding to the stationary state of the vehicle; it changes from this state when the vehicle is found to be moving.

As mentioned previously, the most critical situations for the estimation of the sign of the velocity are those characterized by starts with very low acceleration, when the uncertainties present may cause an error in the sign of the second member of equation (12). However, the uncertainties in the measurements and in the estimates used are small during the phase in which the vehicle is driven away, and therefore the probability of incorrect estimation of the sign is relatively low. To make the algorithm more reliable, it was decided to ignore the calculation of the residues when the estimated slope was below a certain threshold (which was set at 3% for the drive-away control of the test vehicle in question) and to supply in this case a sign of velocity compatible with the engaged gear. This is because it is important for the drive-away control algorithm to recognize rapidly the reversing of the vehicle with medium to high acceleration, in other words on medium to high road slopes, and therefore the aforementioned threshold makes the algorithm more robust, since it is improbable that the vehicle is reversing in the presence of a small slope. When the road slope is below the predetermined threshold and the vehicle is not in neutral, the variable NvalidSegno takes the value 1. This is because, during the testing phase, it was found that the acceleration of the vehicle's movement in the presence of significant slopes was always such that a correct estimate of the sign of velocity was obtained.

The variable NValidSegno also takes the value of 1 when the vehicle is moving during the phase of initialization of the system.

If the vehicle is in neutral, the sign of the velocity is determined without consideration of the calculation of the residuals, but simply on the basis of the information on the slope at the start of the manoeuvre. This makes the sign estimation faster and more robust, since in the first place it is unnecessary to wait for the residuals to exceed the predetermined threshold, and in the second place the disturbance due to pitching has less effect. There is another reason, explained below, why it is more reliable to evaluate the sign of the velocity by only considering the initial slope when the vehicle is in neutral.

Except in the cases where the vehicle is in neutral or the initial slope is below the predetermined threshold, all the other situations are controlled by determining the sign on the basis of the calculation of the residuals: as soon as one of the residuals exceeds a certain threshold, the algorithm assigns the value 1 to the output sign if the modulus of ResP is smaller than the modulus of ResN, while it assigns the value of −1 to it if the modulus of ResP is greater than the modulus of ResN. Increasing the value of the threshold used for testing the residuals increases the robustness of the measurement of the angular velocity in the presence of disturbances, but also reduces the speed of recognition of the direction of movement.

To control situations in which the movement of the vehicle is reversed but the calculation of the residuals is not enabled, or the calculation supplies an incorrect result, the external condition ExtCondSgn is used; if this has a value of 1, it forces the sign to be compatible with the engaged gear.

The conditions for changing from one state to another explained above, indicated as CONDITION 1, CONDITION 2, CONDITION 3, CONDITION 4 and CONDITION 5 in FIG. 18, are described by the following propositions, expressed in formulae.

CONDITION 1: the proposition (SottoSoglia=0) AND (gear=0 OR NValidSegno=1 OR (ResP≠ResN AND (ResP>SogliaRes OR ResN>SogliaRes))) is true and the proposition ((ResP>ResN AND NValidSegno=0 AND gear≠0) OR (NValidSegno=1 AND gear=7) OR (gSinAlfa>0 AND gear=0)) is true.

CONDITION 2: the proposition (SottoSoglia=0) AND (gear=0 OR NValidSegno=1 OR (ResP≠ResN AND (ResP>SogliaRes OR ResN>SogliaRes))) is true and the proposition ((ResP>ResN AND NValidSegno=0 AND gear≠0) OR (NValidSegno=1 AND gear=7) OR (gSinAlfa>0 AND gear=0)) is false.

CONDITION 3: the proposition SottoSoglia=0 AND ((gear≧1 AND gear≦6 AND ExtCondSgn=1)) is true.

CONDITION 4: the proposition SottoSoglia=0 AND (gear=7 AND ExtCondSgn=1) is true.

CONDITION 5: the proposition SottoSoglia=1 is true.

As explained above, for reasons of robustness the sign of the velocity is set in a way which is compatible with the engaged gear when the slope at the start of the manoeuvre is below a certain threshold and the vehicle is not in neutral.

This method of determining the sign is also used on the initialization of the algorithm, if the velocity sensors do not supply a zero value. This situation can occur if the velocity sensors require a certain stabilization time, which has not elapsed at the instant of initialization of the system; or if the vehicle is actually moving at the moment when the system is initialized. This is because, when the system is started, the sign of the movement cannot be reliably determined on the basis of the calculation of the residuals if the sensors have not been stabilized or if the vehicle is already moving.

Figure 19:
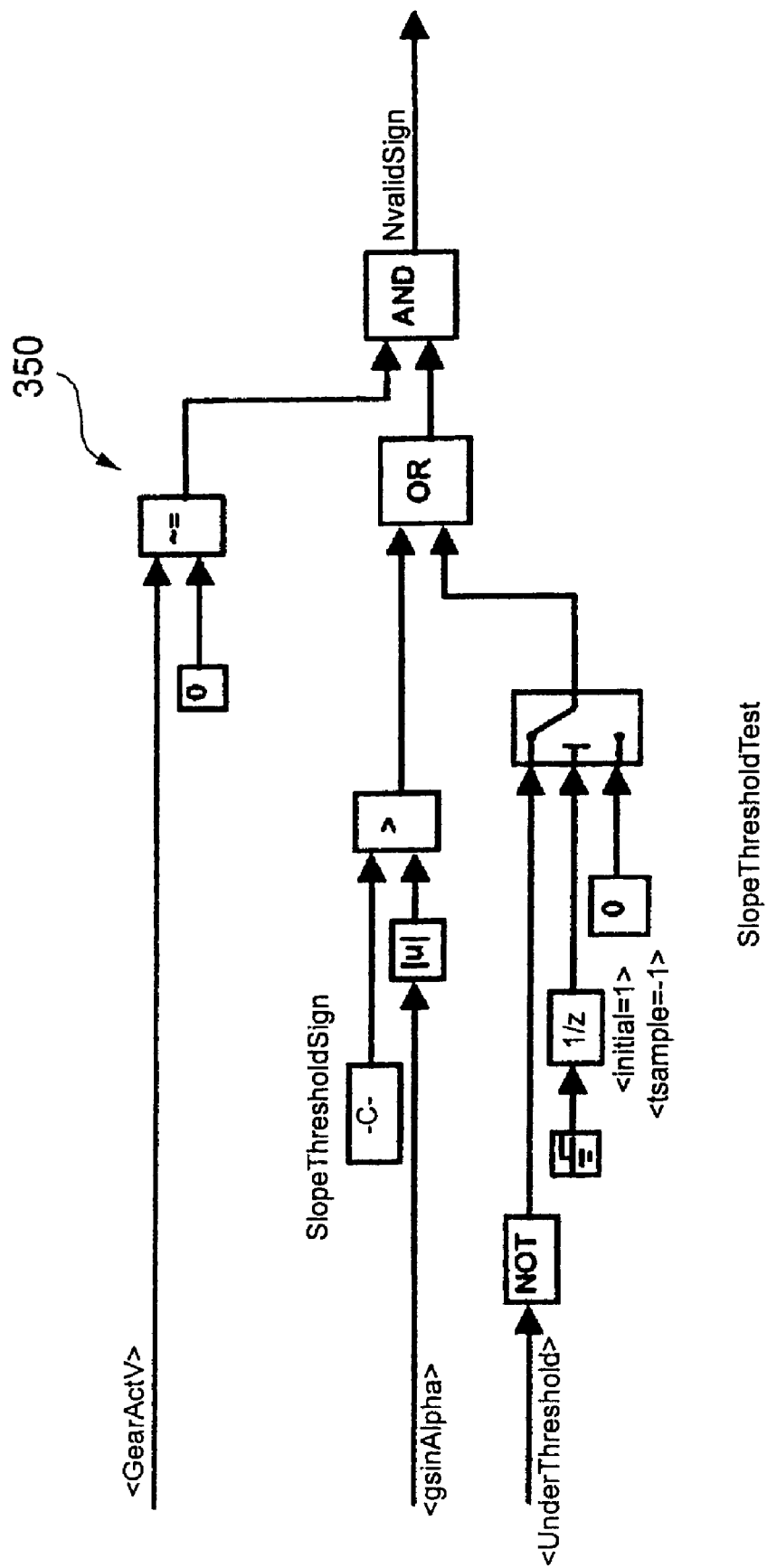
FIG. 19 is a diagram of another sub-block of the block of FIG. 16.

The diagram of the Slope Threshold Test block 350 for supplying the variable which indicates when the sign has to be determined on the basis of the gear engaged is shown in FIG. 19. In particular, the variable NValidSegno has the value 1 when the values of the signals ResP and ResN have to be ignored in the determination of the sign.

The algorithm for estimating the road slope and the sign of the velocity is based on two pieces of information: the longitudinal acceleration, measured directly by an accelerometer, and the modulus of the velocity of the vehicle, found by various methods according to the situation. The vehicles are generally fitted with four sensors which measure the angular velocity of the four wheels and with a sensor which measures the angular velocity of the gearbox primary.

These sensors show a discontinuity at low velocity, since they supply a zero output for velocities below a certain threshold and start to make measurements for velocities above the threshold.

The reading threshold of the sensor of the gearbox primary of the test vehicle in question is approximately 15 rad/s, which, when converted to the wheel value by dividing it by the transmission ratio ($\tau$=13.7), becomes of the order of 1 rad/s; however, the reading threshold of the sensors measuring the angular velocity of the wheels is approximately 2.2 rad/s. It can therefore be deduced that the measurement of the sensor located on the gearbox primary makes it possible to detect lower velocities of the vehicle than those which can be measured directly on the wheels. It is important to point out that the experimental trials conducted to test the estimation algorithm show that the direction of movement of the vehicle is recognized, in the great majority of cases, when the angular velocity of the wheels is below the reading threshold of the corresponding sensors.

To make the estimation algorithm as reliable, fast and accurate as possible, the velocity of the vehicle is determined by multiplying the radius of the wheels by the mean angular velocity of the non-driving wheels when the corresponding sensors supply a measurement above the aforementioned threshold, while the angular velocity of the gearbox primary and the information on the transmission ratio are used when the sensors measuring the velocity of the wheels supply a zero output.

However, it must be emphasized that the velocity of the wheels found from the primary velocity measurement is affected by the fact that the dynamics of the drive line and the slipping of the driving wheels are disregarded. To diminish these disturbances, it was decided to filter the measurement of the angular velocity of the gearbox primary of the test vehicle with a low-pass filter (this filter has a cut-off frequency of 2 Hz for the drive-away control of the test vehicle).

Figure 20:
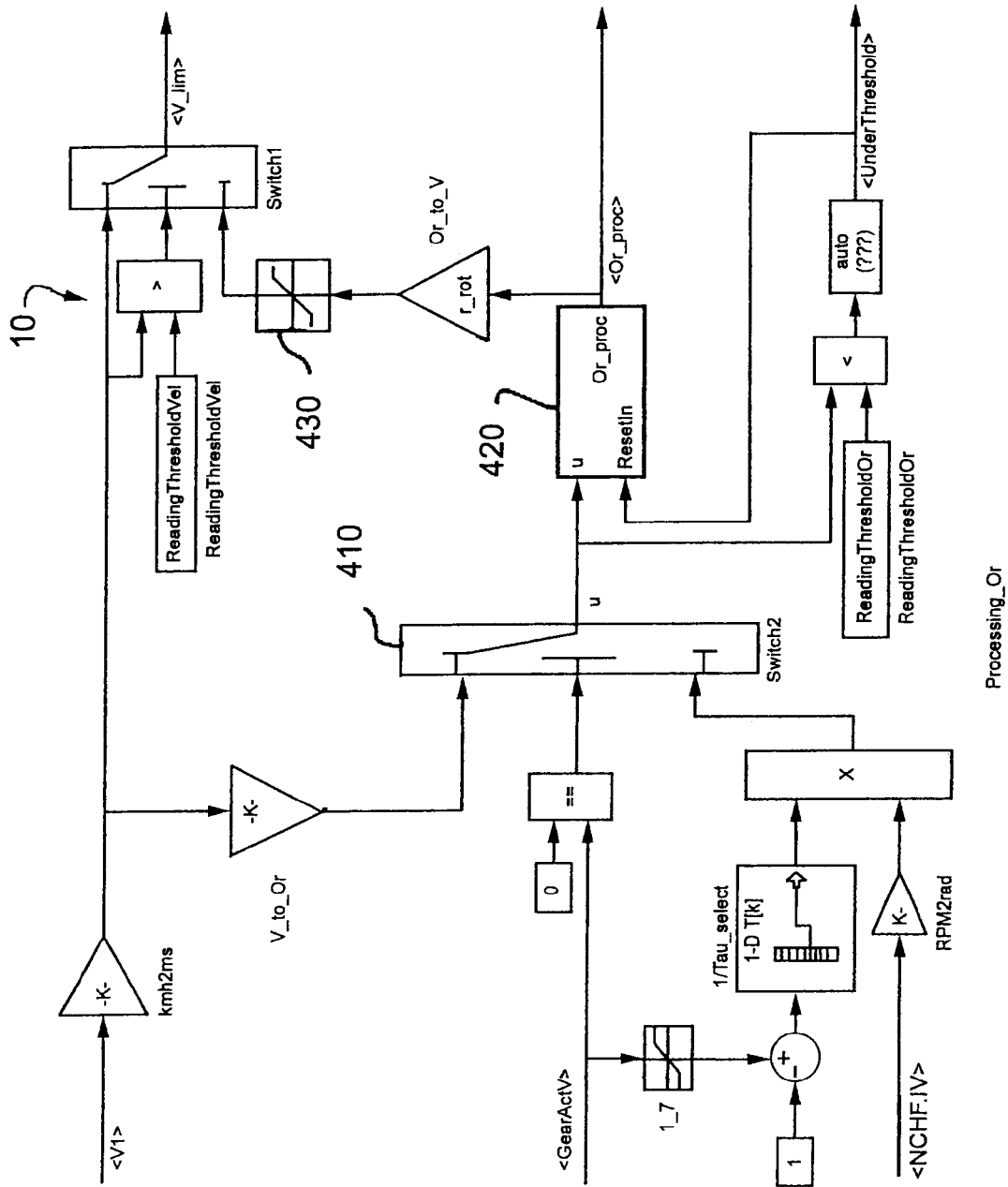
FIG. 20 is a diagram of another block of the algorithm of FIG. 3.

The block 10 called Processing_or, shown in FIG. 20, receives at its input the modulus of the velocity of the vehicle V1 in km/hr, calculated by multiplying the radius of the wheels by the mean of the angular velocities of the non-driving wheels; the signal NCltFilV indicating the angular velocity of the gearbox primary in RPM; and the information on the gear engaged, GearActV.

The outputs are the modulus of the velocity of the vehicle V_lim in m/s, the modulus of the angular velocity of the gearbox primary Or_proc in rad/s, and the signal SottoSoglia which indicates whether the vehicle is stationary or moving.

In particular, the information as to whether the vehicle is stationary or moving, supplied by the signal SottoSoglia, is found by comparing the velocity of the vehicle with a predetermined threshold (SogliaLetturaOr). The velocity of the vehicle used for the comparison is calculated on the basis of the measurement of the sensor on the gearbox primary, since it is essential that the minimum detectable velocity is the smallest which can be obtained in order to start the sign determination procedure as soon as possible. The only situation in which the measurement of the velocity of the gearbox primary cannot be used is when the vehicle is in neutral, since the drive line is disconnected from the wheels. The discrimination between the two cases is provided by means of a block 410 called Switch2. It is also necessary for the velocity signal used for the aforesaid comparison not to be excessively filtered, in order to avoid the concealment of reversals of the movement by cutting off a fast double crossing of the threshold. The latter case may occur, for example, when a gear change from reverse to first or first to reverse is made while the vehicle is still moving.

The output signal Or_proc represents the information on the angular velocity of the wheels which must be used for the calculation of the variables ResP and ResN. This velocity must have the same reading threshold as the velocity signal used to detect the starting of the vehicle; it is therefore derived from the latter signal after appropriate filtering applied to eliminate any oscillations due to the drive line dynamics. A rise in the cut-off frequency of the filter increases the speed of the phase of recognizing the sign of velocity, but also decreases the robustness in the presence of oscillations and disturbances in the measurement of the angular velocity of the gearbox primary. The aforementioned filtering is carried out by a filter block 420 (having a cut-off frequency set at 1 Hz), which is "reset" to the value of the measurement whenever the angular velocity of the gearbox primary crosses the threshold SogliaLetturaOr. This reset makes it possible to eliminate any errors in the estimate of the sign of velocity due to oscillations or sudden peaks which may occur before the velocity of the gearbox primary crosses the threshold. These peaks, which frequently occur in gear changes from first to reverse or from reverse to first with the vehicle in motion, would not be entirely attenuated by the filter block in the absence of the reset, and would therefore affect the calculation of the residuals and might cause an error in the estimation of the direction of movement of the vehicle.

The output V_lim represents the velocity of the vehicle, which is used to estimate the slope with the Kalman filter, and which is determined directly from the measurement of the velocities of the wheels, when the sensors on the wheels measure velocities above the corresponding reading threshold or when the vehicle is in neutral; or from the velocity calculated by the sensor on the gearbox primary, for velocities below the reading threshold of the sensors on the wheels.

A saturation block 430, set between zero and the value SogliaLetturaVel, serves to eliminate any peaks in the measurement of angular velocity of the gearbox primary, when the measurements of velocity of the non-driving wheels are below the threshold of the corresponding sensors.

An example of the operation of the algorithm for estimating the slope and determining the sign of the movement will now be described. In particular, the experimental test relates to the driving away of the aforementioned test vehicle with reference to Table 2, with the accelerator pedal depressed by approximately 100%, from a stationary condition of the vehicle and in the presence of a slope of approximately 20%. The vehicle initially reverses for approximately one second, after which it starts to move forwards with high acceleration and finally halts on the flat.

Figure 21:
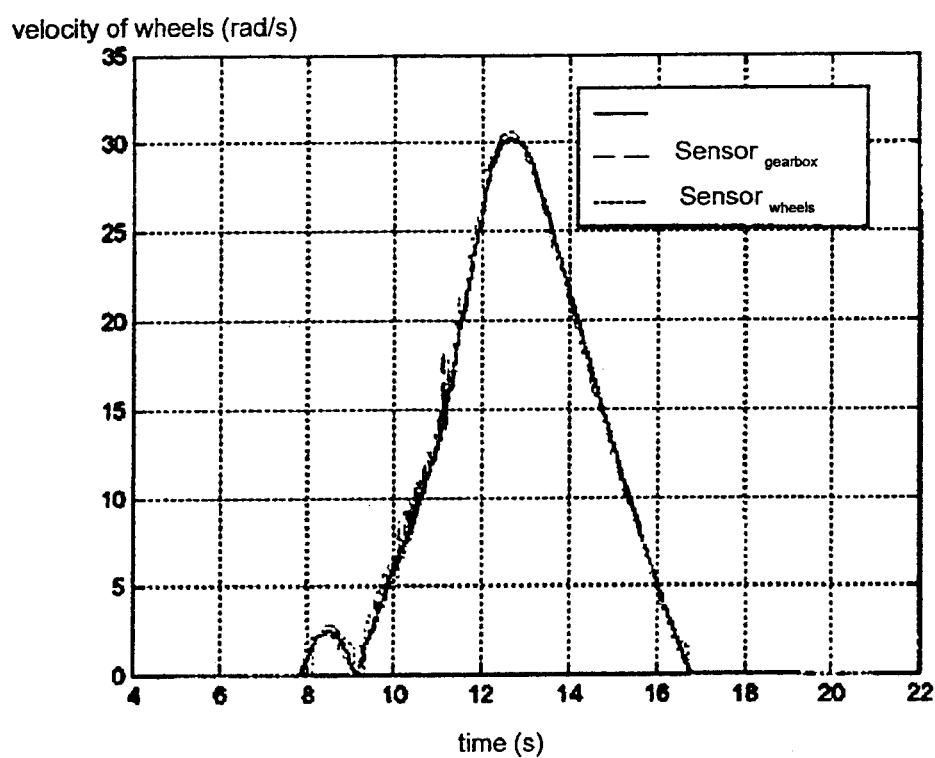
FIGS. 21 to 27 are graphs showing the results of an experimental test of the algorithm of FIG. 3.

FIG. 21 shows the variations with time of the angular velocity of the wheels.

The variable Or_proc represents the angular velocity of the wheels used to calculate the residuals, which is substantially found from the measurement of the angular velocity of the gearbox primary filtered with a first-order filter having a pole of 2 Hz; the signal $sensor_{gearbox}$ represents the angular velocity of the wheels found from the measurement of the angular velocity of the gearbox primary filtered with a first-order filter having a pole of 10 Hz; the variable $sensor_{wheels}$ is the mean of the measurements of the angular velocity supplied by the sensors located on the non-driving wheels.

The three signals shown in FIG. 21 do not contain the sign information, and therefore the initial reversing of the vehicle (from the instant t=8 s to the instant t=9 s) is indicated by a positive curvature.

Figure 22:
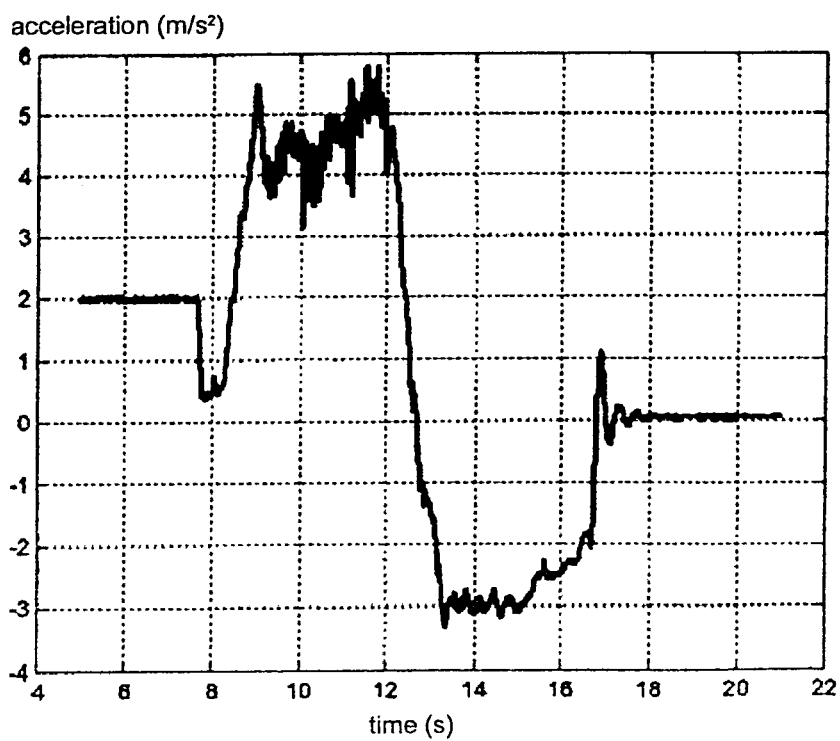

The measurement supplied by the accelerometer is shown in FIG. 22, and, as can be seen, the initial value with the vehicle stationary is different from zero, since the vehicle is on a slope, while the accelerometer measurement at the end of the experimental test is close to zero, since the vehicle is substantially on the flat.

Figure 23:
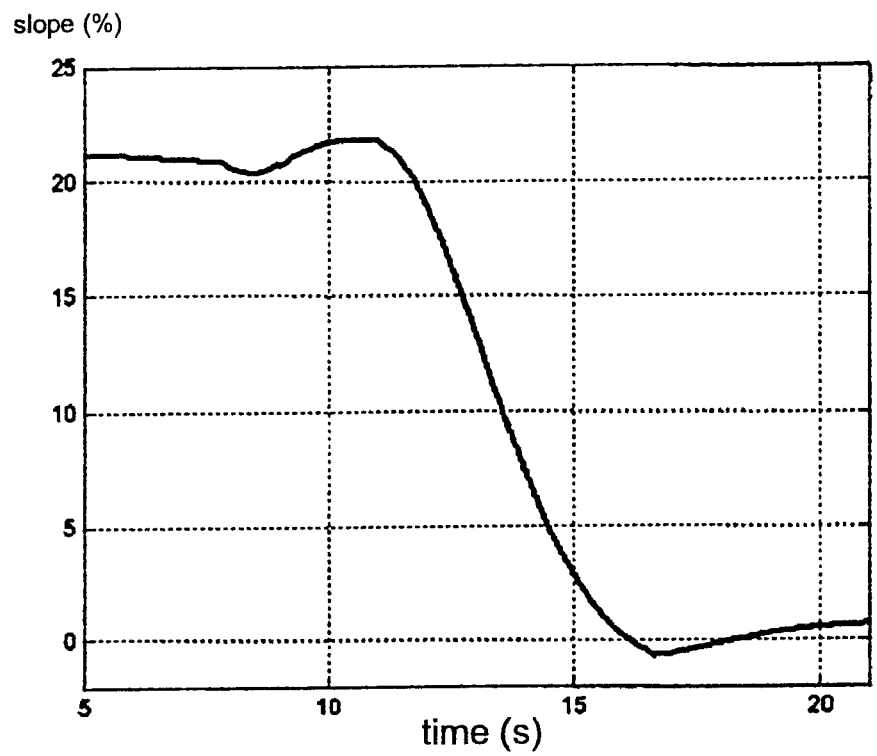

The evolution of the estimated slope with time is shown in FIG. 23, where slight oscillations can be seen at the time when the vehicle is reversing. These oscillations are caused by the pitching component which acts as a disturbance and is measured by the accelerometer as a variation of slope, and by the uncertainty as to the sign, which persists for a few fractions of a second when the vehicle begins to move. In particular, the initial uncertainty about the sign (also extended for a non-zero reading threshold of the sensors) is controlled by setting the information on the velocity of the vehicle to zero, and therefore causes the initial variation of the measurement supplied by the accelerometer to be interpreted as a variation of slope, whereas in reality it is due to the fact that the vehicle is starting to move.

Figure 24:
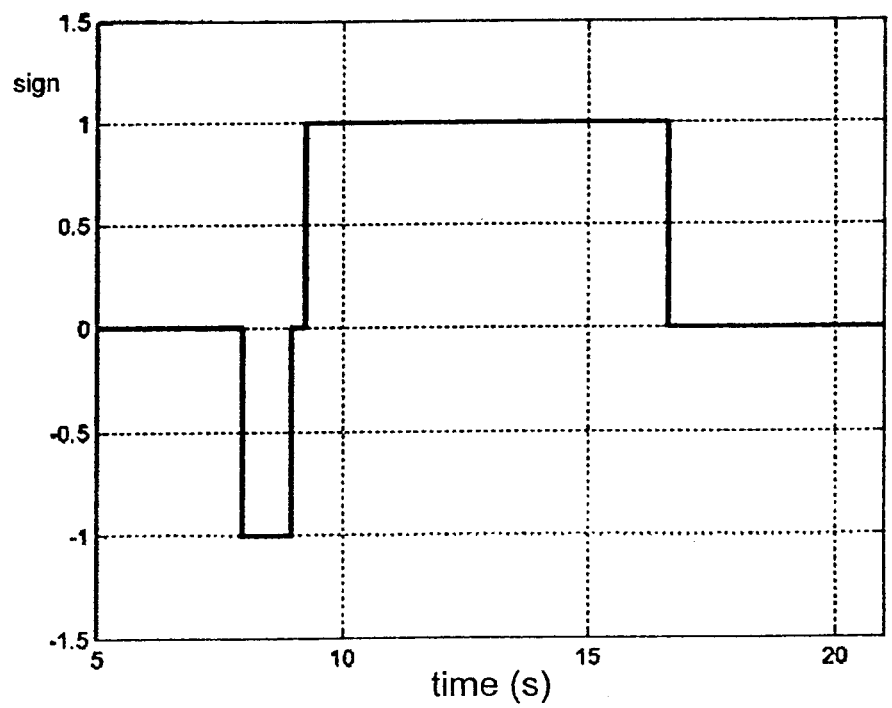

By comparing the information on the angular velocity of the wheels (FIG. 21) with the evolution in time of the sign estimated by the algorithm (FIG. 24), we find that the times required to determine the direction of the motion are of the order of a fraction of a second.

Figure 25:
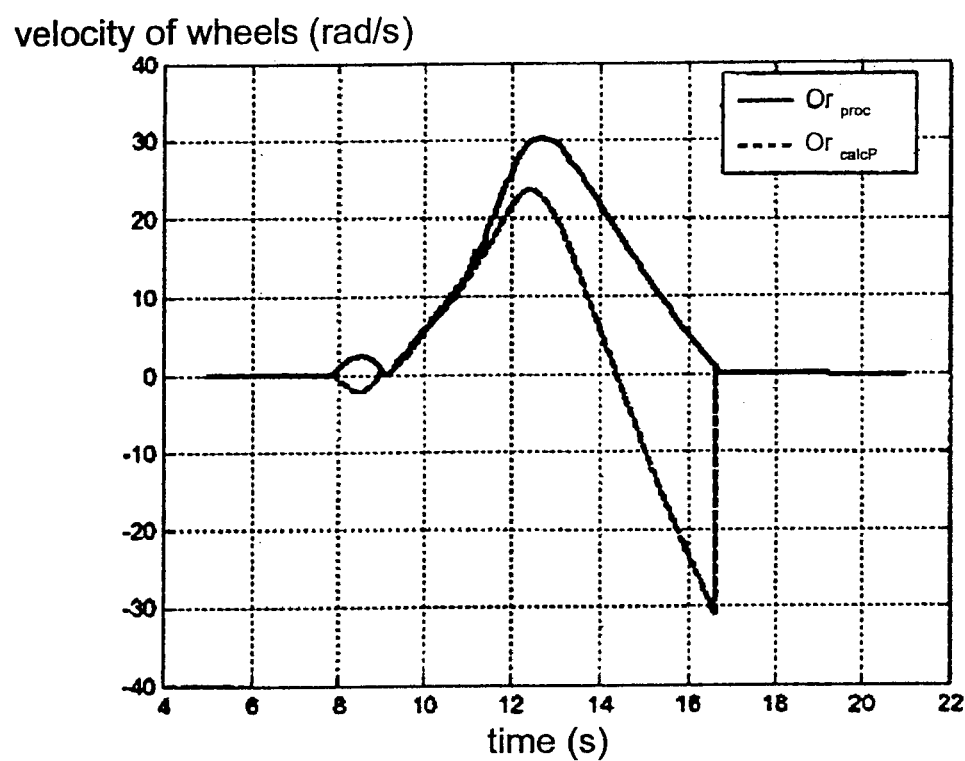
Figure 26:
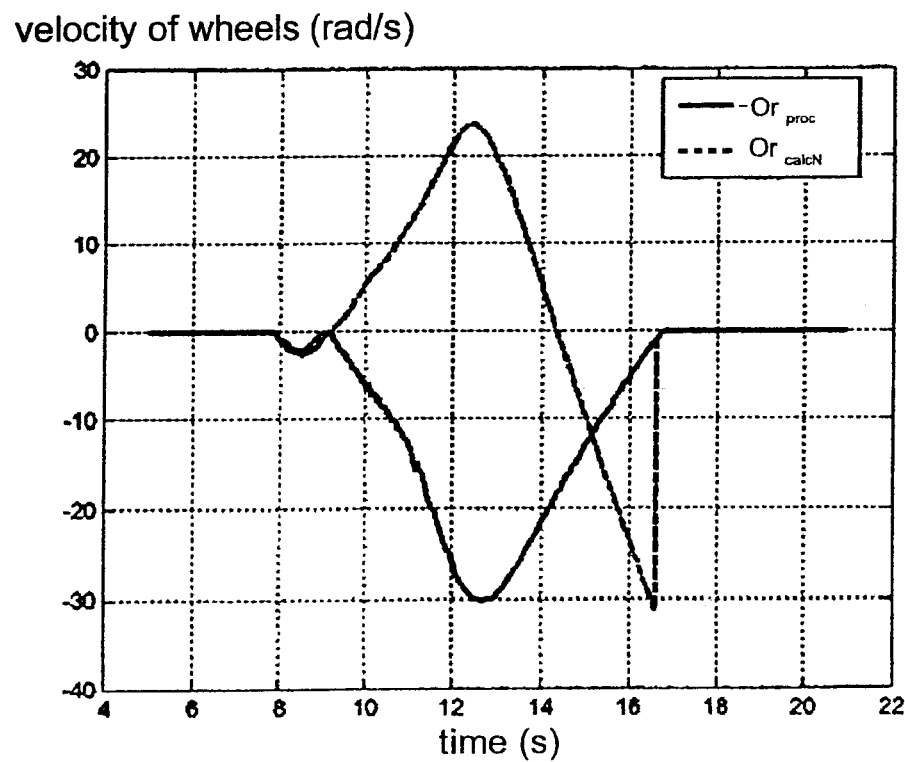
Figure 27:
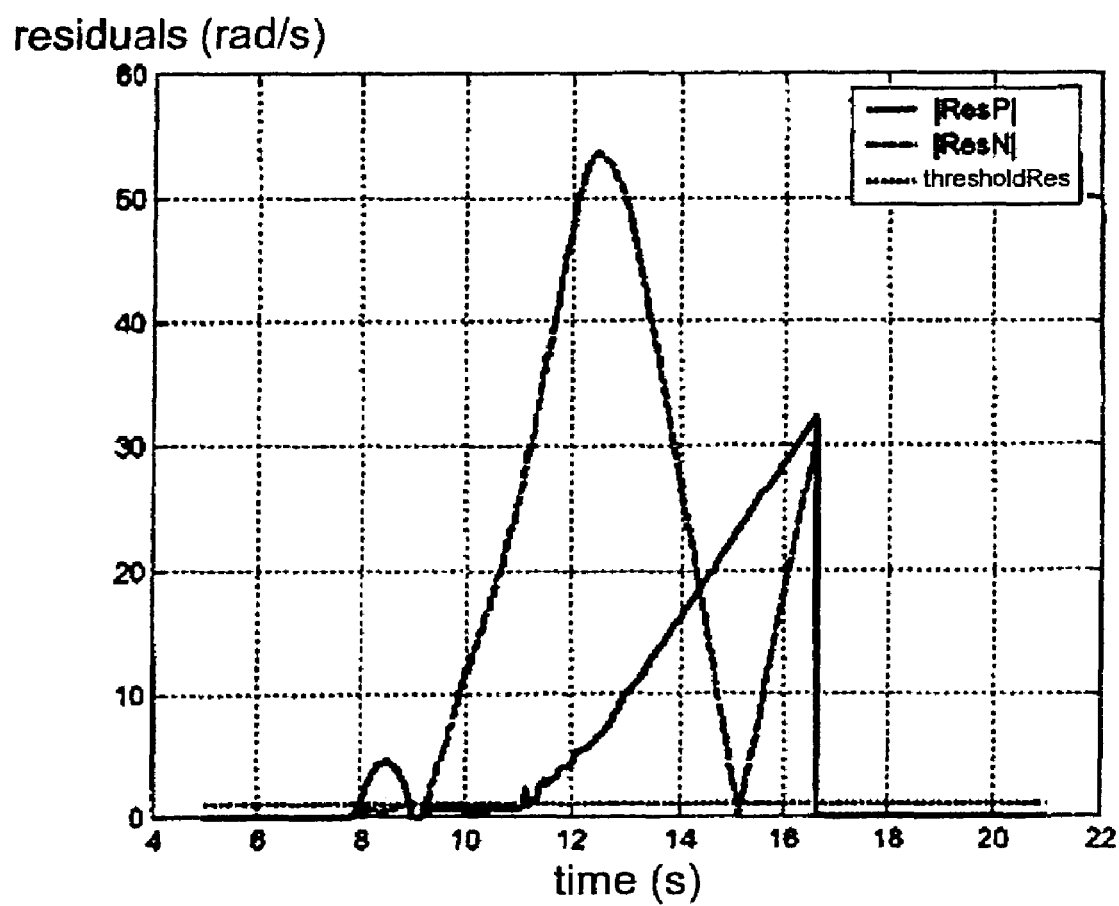

FIG. 25 shows the evolution of the variables Or_proc and Or_calcP, while FIG. 26 shows the evolution of the variables −Or_proc and Or_calcN; the moduli of the differences between the aforesaid pairs of variables (which represent the residuals) are shown in FIG. 27. It must be emphasized that, for the sake of clarity, the calculation of the angular velocities Or_calcN and Or_calcP and of the respective residuals ResP and ResN is not disabled after the determination of the sign of the velocity; in practice, however, as explained above, the computation of these variables ceases after the sign of the motion has been estimated.

The sign is determined by comparing the moduli of the residuals at the instant at which one of the two exceeds the set threshold value SogliaRes (the dotted line in FIG. 27). In particular, during the reversing phase of the vehicle, the modulus of the residual ResN is smaller than the modulus of ResP, which indicates the reverse direction of the vehicle; in the initial phase of forward movement, the modulus of the variable ResN is greater than that of ResP, thus enabling the sign of the motion to be correctly detected. However, near the instant t=11 s the value of $O_{r\_calcP}$ starts to diverge from the value of $O_{r\_proc}$, and the modulus of the residual ResP exceeds the modulus of the residual ResN during the time interval (14.5; 16.5)s. This behaviour is entirely predicted and does not indicate a malfunction of the system, since it is due to the fact that the real slope varies, while the angular velocity $O_{r\_calcP}$ continues to be calculated with the slope value stored when the vehicle started. It will be recalled that the calculation of the angular velocities and of the corresponding residuals is disabled once the direction of movement of the vehicle has been determined, and it is therefore essential that the value of the residuals should indicate the direction of movement only during the phase of determination of the sign of the velocity.

As mentioned above, the estimation algorithm which has been described was used as a method of analytical redundancy in the drive-away control of the test vehicle, in order to increase the reliability of the information on the direction of movement (and consequently the information on the road slope). This is because measurements of the sign of velocity of the wheels are present in the aforesaid vehicle, being supplied by the controller of the anti-skid system, and in case of fault these are ignored and replaced with the estimated information.

The algorithm for estimating the road slope and the direction of movement of the vehicle which was designed for use in the drive-away control of the test vehicle had the parameter values shown in the tables below. In particular, Table 4 contains the values of the thresholds, the saturations, the pole of the filter, and conversion tables used to process the various values needed for the correction operation of the whole algorithm.

Table 5 shows the values of the state matrices of the Kalman filter in continuous time; and finally Table 6 contains the characteristic parameters of the vehicle, which are used in the estimation algorithm.

TABLE 4

| Symbol | Value | | | | | | | Unit | Motes |
|---|---|---|---|---|---|---|---|---|---|
| R_G2PercentAx | [−.707 | −.24 | −.1 | 0 | .1 | .24 | .707] | | vector x of the table which converts sin (α) to a percentage slope |
| R_G2PercentAy | [−100 | −25 | −10 | 0 | 10 | 25 | 100] | % slope | vector y of the table which converts sin (α) to a percentage slope |
| In_sin | R_G2PercentAx | | | | | | | | vector x of the table relating to the function y=asin (x) |
| Out_sin | asin (R_G2PercentAx) | | | | | | | rad | vector y of the table relating to the function y=asin (x) |
| SogliaLetturaVel | 0.75 | | | | | | | m/s | reading threshold set for the direct reading of the velocity of the wheels |
| SogliaLetturaOr | 0.3 | | | | | | | rad/s | threshold of the angular velocity of the wheels calculated from the velocity of the gearbox primary to discriminate between the stationary and moving vehicle situations |
| SogliaPendSegno | 0.294 | | | | | | | g • sin (α) | threshold of |

TABLE 4-continued

| Symbol | Value | Unit | Motes |
|---|---|---|---|
| SogliaRes | 1.1 | rad/s | slope below which the direction of movement is set to be compatible with the gear threshold for the comparison of the residuals |
| p_filRes | 2*π*1 | rad/s | pole of the filter block in the Processing_Or subsystem |
| UpSatPnd | 0.287 | sin (α) | upper saturation for the slope estimation |
| LowSatPnd | −0.287 | sin (α) | lower saturation for the slope estimation |

TABLE 5

| Symbol | Value | Notes |
|---|---|---|
| A_kf_tot | $\begin{bmatrix} -1.005 & -9.807 & 1 \\ 0.051 & -0.02 & 0 \\ -0.007 & 0 & -0.006 \end{bmatrix}$ | A-state matrix of the Kalman filter |
| B_kf_tot | $\begin{bmatrix} 1.005 & 1 \\ -0.051 & 0 \\ 0.007 & 0 \end{bmatrix}$ | B-state matrix of the Kalman filter |
| C_kf_tot | [0 1 0] | C-state matrix of the Kalman filter |
| D_kf_tot | [0 0] | D-state matrix of the Kalman filter |

TABLE 6

| Symbol | Value | Unit | Notes |
|---|---|---|---|
| r_rot | 0.3325 | m | wheel radius |
| tau_m_2 | $\begin{bmatrix} 13.742 \\ 9.025 \\ 6.729 \\ 5.307 \\ 4.324 \\ 3.672 \\ 13.742 \end{bmatrix}$ | | transmission ratio $\tau\tau_p$ with change of gear (first . . . sixth, reverse) |

Clearly, provided that the principle of the invention is retained, the details of construction and the forms of embodiment can be varied widely from what has been described and illustrated, without departure from the scope of the invention. For example, the sign detection algorithm can be implemented on the basis of the relation (11), instead of the relation (12). In this case, the angular velocities $O_{r\_calcP}$ and $O_{r\_calcN}$ are defined by the following relations:

$$O_{r\_calcP} = O_{r\_proc}(t_0) + \int_0^t \frac{1}{J_{eq}}(C_T - C_R - Rmg\sin\alpha(t_0))dt,$$

$$O_{r\_calcN} = -O_{r\_proc}(t_0) + \int_0^t \frac{1}{J_{eq}}(C_T - C_R - Rmg\sin\alpha(t_0))dt,$$

where $J_{eq}$ represents the equivalent inertia of the vehicle with respect to the wheels; $C_T$ is the torque transmitted to the wheels; $C_R$ indicates the resistant torque at the wheels, including the contribution of the brakes, the friction of the tyres and the aerodynamic resistance of the vehicle; R represents the radius of the wheels; m is the mass of the vehicle; and $\omega_{wheels}$ indicates the mean angular velocity of the non-driving wheels.

Finally, it is emphasized that the method according to the invention can be used in various applications, particularly in the field of transmission control.

What is claimed is:

1. Method of estimating the slope of a road on which there is positioned a motor vehicle provided with rotational velocity sensor means for measuring the modulus of the velocity of the vehicle and with acceleration measuring means for measuring the acceleration in the longitudinal direction of the vehicle, characterized in that it comprises the following operations:
   a) providing a signal indicating the measurement of the velocity of the vehicle (V1, NCltFilV) by means of the said velocity sensor means;
   b) providing a signal indicating the measurement of the acceleration in the longitudinal direction of the vehicle (AxVehFilV) by means of the said acceleration measuring means;
   c) determining an estimated value of the slope of the road (StimaPend), the said determination of the estimated value comprising, subject to a condition of enabling the estimation, the processing of the velocity measurement signal (V1) and of the acceleration measurement signal (AxVehFilV) by means of a mathematical model based on the relation $$A_x = \dot{v} + g \sin \alpha,$$

where $A_x$ represents the measurement of acceleration in the longitudinal direction of the vehicle, $\dot{v}$ indicates the component of longitudinal acceleration of the vehicle along the road, g is the gravitational acceleration and $\alpha$ represents the angle of inclination of the road profile;

d) processing the velocity measurement signal (V1, NCltFilV), the acceleration measurement signal (AxVehFilV) and the estimated value of the slope (StimaPend) in such a way as to determine the sign of the velocity of the vehicle (Segno); and e) repeating operations a) to d) recursively according to a predetermined rule, in which the sign of the velocity (Segno) determined in operation d) of a specific recursive step is used as an additional input for operation c) of a successive recursive step to update the estimated value of the slope of the road (StimaPend).

2. Method according to claim 1, in which the said velocity sensor means comprise wheel sensor means, capable of providing a signal indicating the measurement of the angular velocity of at least one wheel of the motor vehicle, and sensor means of the gearbox primary, capable of providing a signal indicating the measurement of the angular velocity of the primary shaft of the gearbox of the motor vehicle, and in the said operation a) the signal indicating the measurement of the velocity of the vehicle (V1, NCltFilV) is selectively determined, according to the conditions of motion of the motor vehicle, on the basis of the signal indicating the measurement of the wheel sensor means or of the sensor means of the gearbox primary of the motor vehicle.

3. Method according to claim 1, in which the processing of operation c) is implemented by means of a Kalman filter (20) having the form $$\hat{x}(k) = A_d \cdot \hat{x}(k-1) + B_d \cdot u_d(k-1)$$

$$\hat{y}(k-1) = C_d \cdot \hat{x}(k-1)$$

where $A_d$, $B_d$ and $C_d$ are transfer matrices; k indicates the sampling instant; $u_d$ is a vector whose first element is the measurement of the velocity of the vehicle corrected with the sign information and whose second element is the measurement of longitudinal acceleration; $\hat{x}$ is an estimated state vector, one component of which is a function of the angle of inclination $\alpha$ of the road.

4. Method according to claim 1, in which operation d) comprises:

storing an initial estimated value $\alpha(t_0)$ of the angle of inclination of the road, where the instant $t_0$ represents the moment at which the start of the vehicle's movement is detected, in a condition in which the vehicle is not in neutral, or in which the estimated value of the slope which is a function of the said initial value $\alpha(t_0)$ is greater than a predetermined threshold, calculating the velocity of the vehicle by integrating the relation $\dot{v} = A_x - g \sin \alpha$ the estimated sign of the velocity corresponding to the sign of the variable found by the integration, when the modulus of the said variable exceeds a certain predetermined threshold.

5. Method according to claim 1, in which operation d) comprises the following phases:

storing an initial estimated value $\alpha(t_0)$ of the angle of inclination of the road, where the instant $t_0$ represents the moment at which the start of the vehicle's movement is detected, in a condition in which the vehicle is not in neutral, or in which the estimated value of the slope which is a function of the said initial value $\alpha(t_0)$ is greater than a predetermined threshold, calculating angular velocities $O_{r\_calcP}$ and $O_{r\_calcN}$, defined by the following relations:

$$O_{r\_calcP} = O_{r\_proc}(t_0) + \frac{1}{R}\int_0^t (A_x - g\sin\alpha(t_0))dt,$$

$$O_{r\_calcN} = -O_{r\_proc}(t_0) + \frac{1}{R}\int_0^t (A_x - g\sin\alpha(t_0))dt,$$

where $O_{r\_proc}$ represents the measured modulus of the angular velocity of at least one wheel of the vehicle, calculating a pair of variables ResP and ResN, defined by the following relations:

$$\text{Res}P = O_{r\_proc} - O_{r\_calcP},$$

$$\text{Res}N = -O_{r\_proc} - O_{r\_calcN},$$

estimating the sign of the velocity (Segno) by comparing the said variables ResP and ResN.

6. Method according to claim 1, in which operation d) comprises the following phases:

storing an initial estimated value $\alpha(t_0)$ of the angle of inclination of the road, where the instant $t_0$ represents the moment at which the start of the vehicle's movement is detected, in a condition in which the vehicle is not in neutral, or in which the estimated value of the slope which is a function of the said initial value $\alpha(t_0)$ is greater than a predetermined threshold, calculating angular velocities $O_{r\_calcP}$ and $O_{r\_calcN}$, defined by the following relations:

$$O_{r\_calcP} = O_{r\_proc}(t_0) + \int_0^t \frac{1}{J_{eq}}(C_T - C_R - Rmg\sin\alpha(t_0))dt,$$

$$O_{r\_calcN} = -O_{r\_proc}(t_0) + \int_0^t \frac{1}{J_{eq}}(C_T - C_R - Rmg\sin\alpha(t_0))dt,$$

where $J_{eq}$ represents the equivalent inertia of the vehicle based on the wheels; $C_T$ is the torque transmitted to the wheels; $C_R$ indicates the resistant torque at the wheels, including the contribution of the brakes, the friction of the tyres and the aerodynamic resistance of the vehicle; R represents the radius of the wheels; m is the mass of the vehicle; and $\omega_{wheels}$ indicates the mean angular velocity of the non-driving wheels, calculating a pair of variables ResP and ResN, defined by the following relations:

$$\text{Res}P = O_{r\_proc} - O_{r\_calcP},$$

$$\text{Res}N = -O_{r\_proc} - O_{r\_calcN},$$

estimating the sign of the velocity (Segno) by comparing the said variables ResP and ResN.

7. Method according to claim 5, in which the said comparison of the variables ResP and ResN is carried out when the value of one of the said variables ResP and ResN exceeds a predetermined threshold (SogliaRes).

8. Computer program product on a computer readable medium which comprises portions of software code for implementing the method according to claim 1.

9. System for estimating the slope of a road for a motor vehicle, comprising rotational velocity sensor means for measuring the modulus of the velocity of the vehicle and acceleration measuring means for measuring the acceleration in the longitudinal direction of the vehicle, positioned on board the vehicle, and processing means, connected for operation to the said velocity sensor means and to the said acceleration measuring means, and programmed for:
   a) receiving a signal indicating the measurement of the velocity of the vehicle (V1, NCltFilV) provided by the said velocity sensor means;
   b) receiving a signal indicating the measurement of the acceleration in the longitudinal direction of the vehicle (AxVehFilV) provided by the said acceleration measuring means;
   c) determining an estimated value of the slope of the road (StimaPend), the said determination of the estimated value comprising, subject to a condition of enabling the estimation, the processing of the velocity measurement signal and of the acceleration measurement signal by means of a mathematical model based on the relation $A_x = \dot{v} + g \sin \alpha$, where $A_x$ represents the measurement of acceleration in the longitudinal direction of the vehicle, $\dot{v}$ indicates the component of longitudinal acceleration of the vehicle along the road, g is the gravitational acceleration and $\alpha$ represents the angle of inclination of the road profile;
   d) processing the velocity measurement signal (V1, NCltFilV), the acceleration measurement signal (AxVehFilV) and the estimated value of the slope (StimaPend) in such a way as to determine the sign of the velocity of the vehicle (Segno); and
   e) repeating operations a) to d) recursively according to a predetermined rule, in which the sign of the velocity (Segno) determined in operation d) of a specific recursive step is used as an additional input for operation c) of a successive recursive step to update the estimated value of the slope of the road (StimaPend).

10. System according to claim 9, in which the said velocity sensor means comprise wheel sensor means, capable of providing a signal indicating the measurement of the angular velocity of at least one wheel of the motor vehicle, and sensor means of the gearbox primary, capable of providing a signal indicating the measurement of the angular velocity of the primary shaft of the gearbox of the motor vehicle, and in which the said processing means are programmed to selectively determine the signal indicating the measurement of the velocity of the vehicle (V1, NCltFilV), according to the conditions of motion of the motor vehicle, on the basis of the signal indicating the measurement of the wheel sensor means or of the sensor means of the gearbox primary of the motor vehicle.

11. System according to claim 9, in which the said processing means are programmed in such a way as to implement the processing of operation c) by means of a Kalman filter (20) having the form $\hat{x}(k) = A_d \cdot \hat{x}(k-1) + B_d \cdot u_d(k-1)$, $\hat{y}(k-1) = C_d \cdot \hat{x}(k-1)$ where $A_d$, $B_d$ and $C_d$ are transfer matrices; k indicates the sampling instant; $u_d$ is a vector whose first element is the measurement of the velocity of the vehicle corrected with the sign information and whose second element is the measurement of longitudinal acceleration; $\hat{x}$ is an estimated state vector, one component of which is a function of the angle of inclination $\alpha$ of the road.

12. System according to claim 9, in which the said processing means are programmed in such a way that operation d) comprises the following phases:
   storing an initial estimated value $\alpha(t_0)$ of the angle of inclination of the road, where the instant $t_0$ represents the moment at which the start of the vehicle's movement is detected,
   in a condition in which the vehicle is not in neutral, or in which the estimated value of the slope which is a function of the said initial value $\alpha(t_0)$ is greater than a predetermined threshold, calculating angular velocities $O_{r\_calcP}$ and $O_{r\_calcN}$, defined by the following relations:

$$O_{r\_calcP} = O_{r\_proc}(t_0) + \frac{1}{R}\int_0^t (A_x - g\sin\alpha(t_0))dt,$$

$$O_{r\_calcN} = -O_{r\_proc}(t_0) + \frac{1}{R}\int_0^t (A_x - g\sin\alpha(t_0))dt,$$

where $O_{r\_proc}$ represents the measured modulus of the angular velocity of at least one wheel of the vehicle, calculating a pair of variables ResP and ResN, defined by the following relations:

ResP = $O_{r\_proc} - O_{r\_calcP}$,

ResN = $-O_{r\_proc} - O_{r\_calcN}$, estimating the sign of the velocity (Segno) by comparing the said variables ResP and ResN.

13. System according to claim 9, in which the said processing means are programmed in such a way that operation d) comprises the following phases:
   storing an initial estimated value $\alpha(t_0)$ of the angle of inclination of the road, where the instant $t_0$ represents the moment at which the start of the vehicle's movement is detected,
   in a condition in which the vehicle is not in neutral, or in which the estimated value of the slope which is a function of the said initial value $\alpha(t_0)$ is greater than a predetermined threshold, calculating angular velocities $O_{r\_calcP}$ and $O_{r\_calcN}$, defined by the following relations:

$$O_{r\_calcP} = O_{r\_proc}(t_0) + \int_0^t \frac{1}{J_{eq}}(C_T - C_R - Rmg\sin\alpha(t_0))dt,$$

$$O_{r\_calcN} = -O_{r\_proc}(t_0) + \int_0^t \frac{1}{J_{eq}}(C_T - C_R - Rmg\sin\alpha(t_0))dt,$$

where $J_{eq}$ represents the equivalent inertia of the vehicle based on the wheels; $C_T$ is the torque transmitted to the wheels; $C_R$ indicates the resistant torque at the wheels, including the contribution of the brakes, the friction of the tyres and the aerodynamic resistance of the vehicle; R represents the radius of the wheels; m is the mass of the vehicle; and $\omega_{wheels}$ indicates the mean angular velocity of the non-driving wheels.

calculating a pair of variables ResP and ResN, defined by the following relations:

$$ResP = O_{r\_proc} - O_{r\_calcP},$$

$$ResN = -O_{r\_proc} - O_{r\_calcN},$$

14. System according to claim 12, in which the said processing means are programmed to execute the said comparison of the variables ResP and ResN when the value of one of the said variables ResP and ResN exceeds a predetermined threshold.

15. System according to claim 13, in which the said processing means are programmed to execute the said comparison of the variables ResP and ResN when the value of one of the said variables ResP and ResN exceeds a predetermined threshold.

* * * * *